March 28, 1939.  W. F. FEYRER  2,152,585
DICTATING MACHINE
Original Filed March 25, 1931  18 Sheets-Sheet 1

INVENTOR.
William F. Feyrer,
BY Janney, Blair & Curtis
ATTORNEYS.

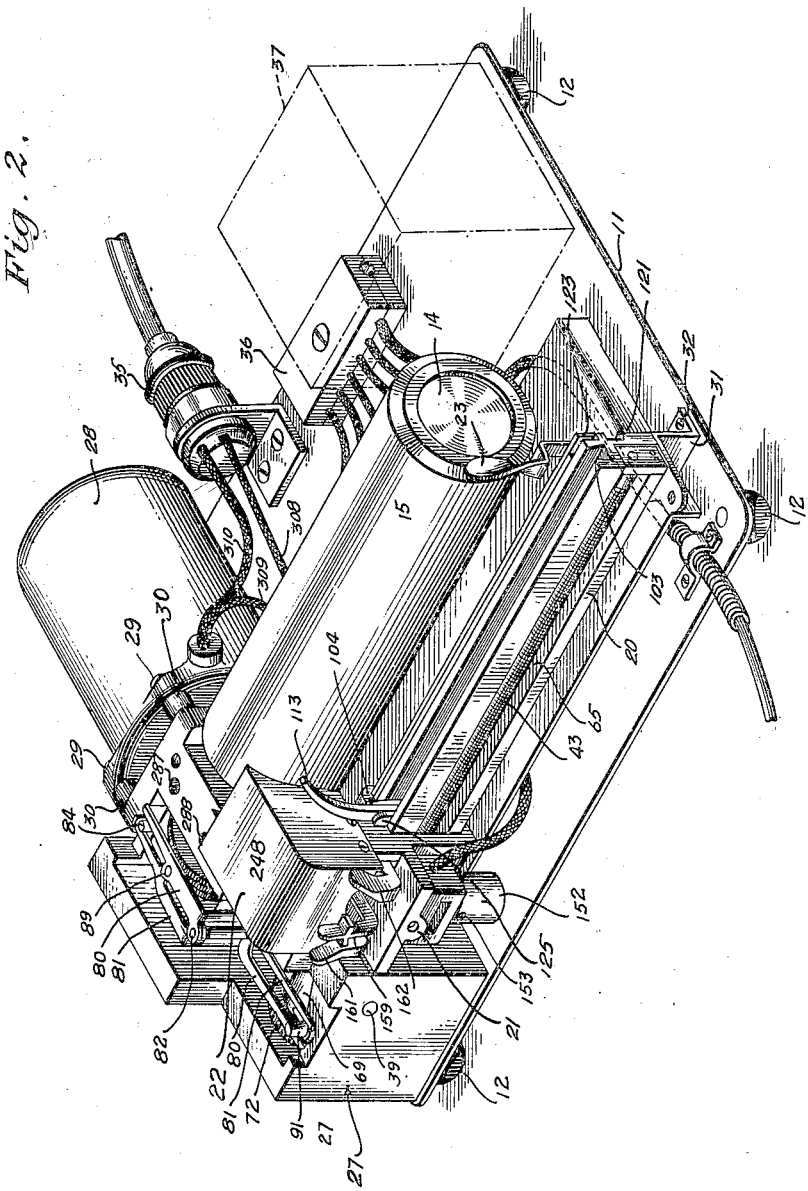

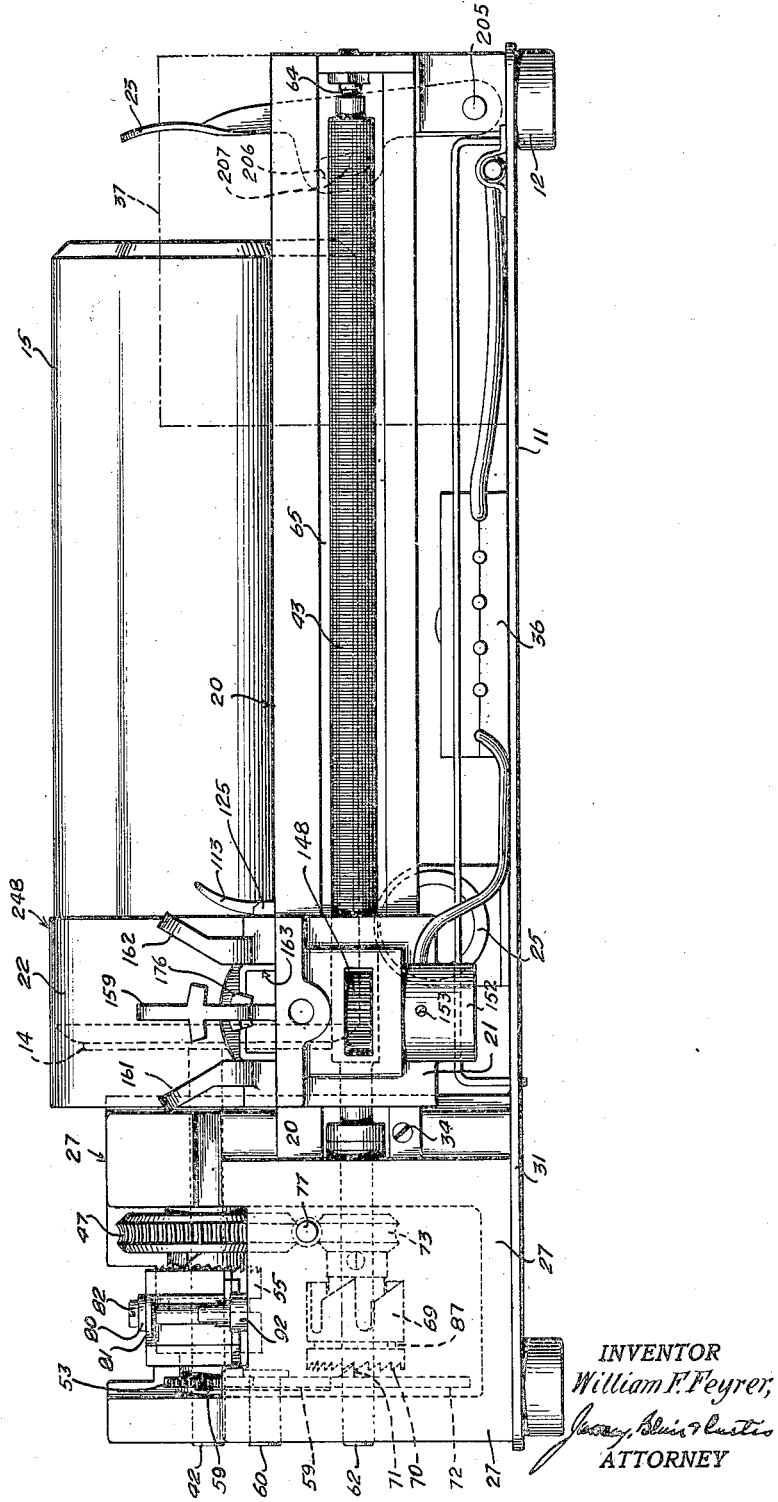

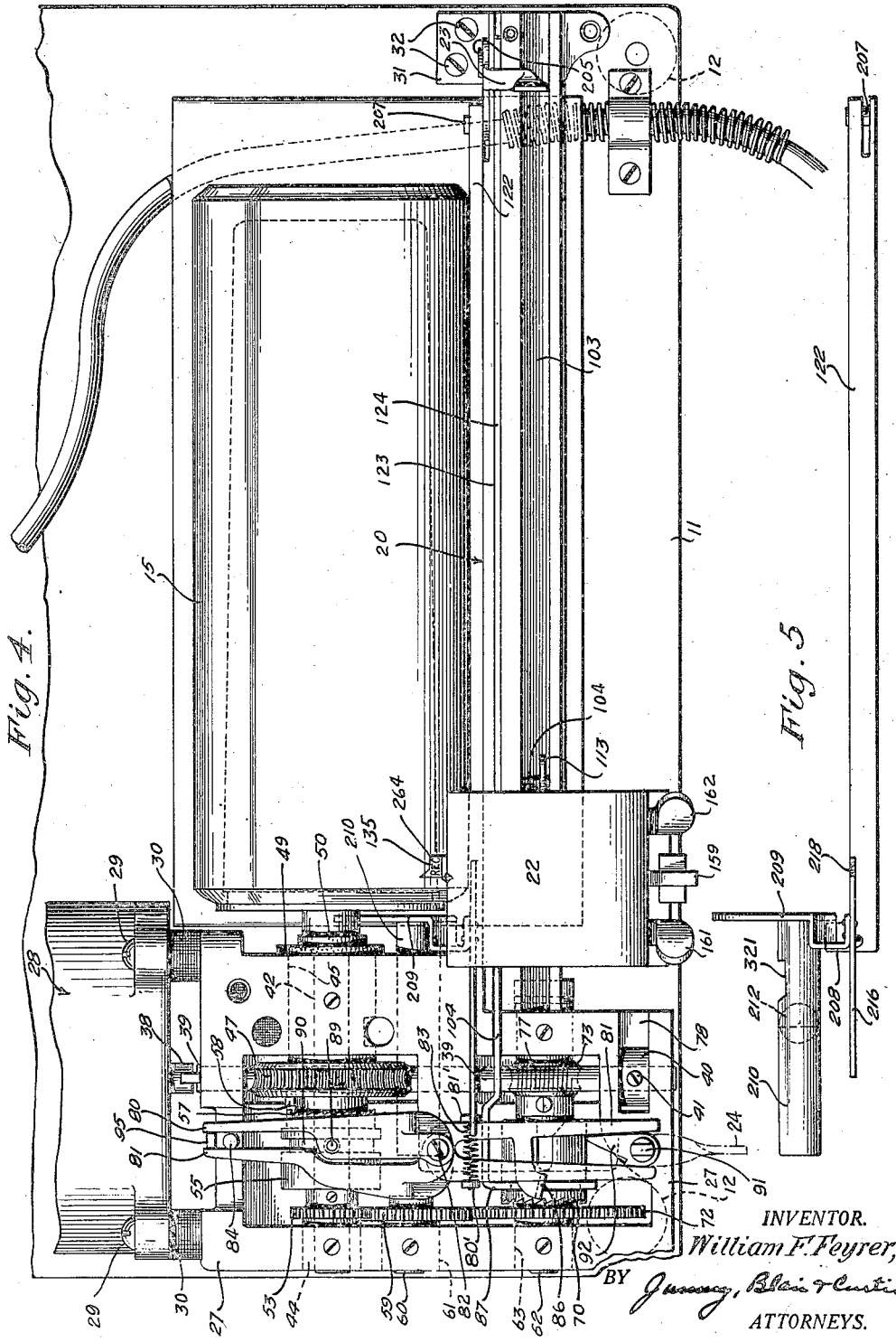

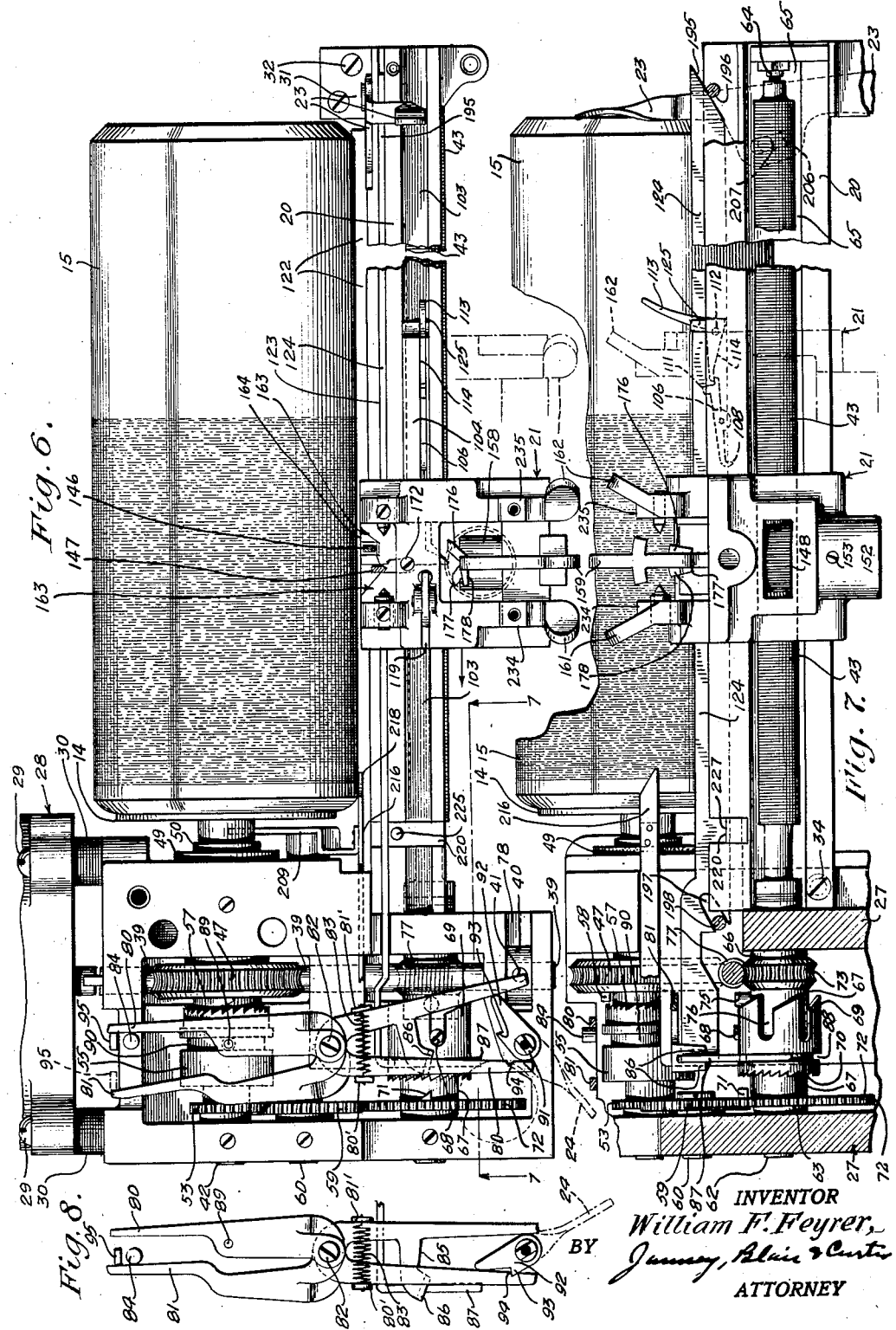

March 28, 1939.   W. F. FEYRER   2,152,585
DICTATING MACHINE
Original Filed March 25, 1931   18 Sheets-Sheet 6

INVENTOR
William F. Feyrer,
BY Janney, Blair & Curtis
ATTORNEY

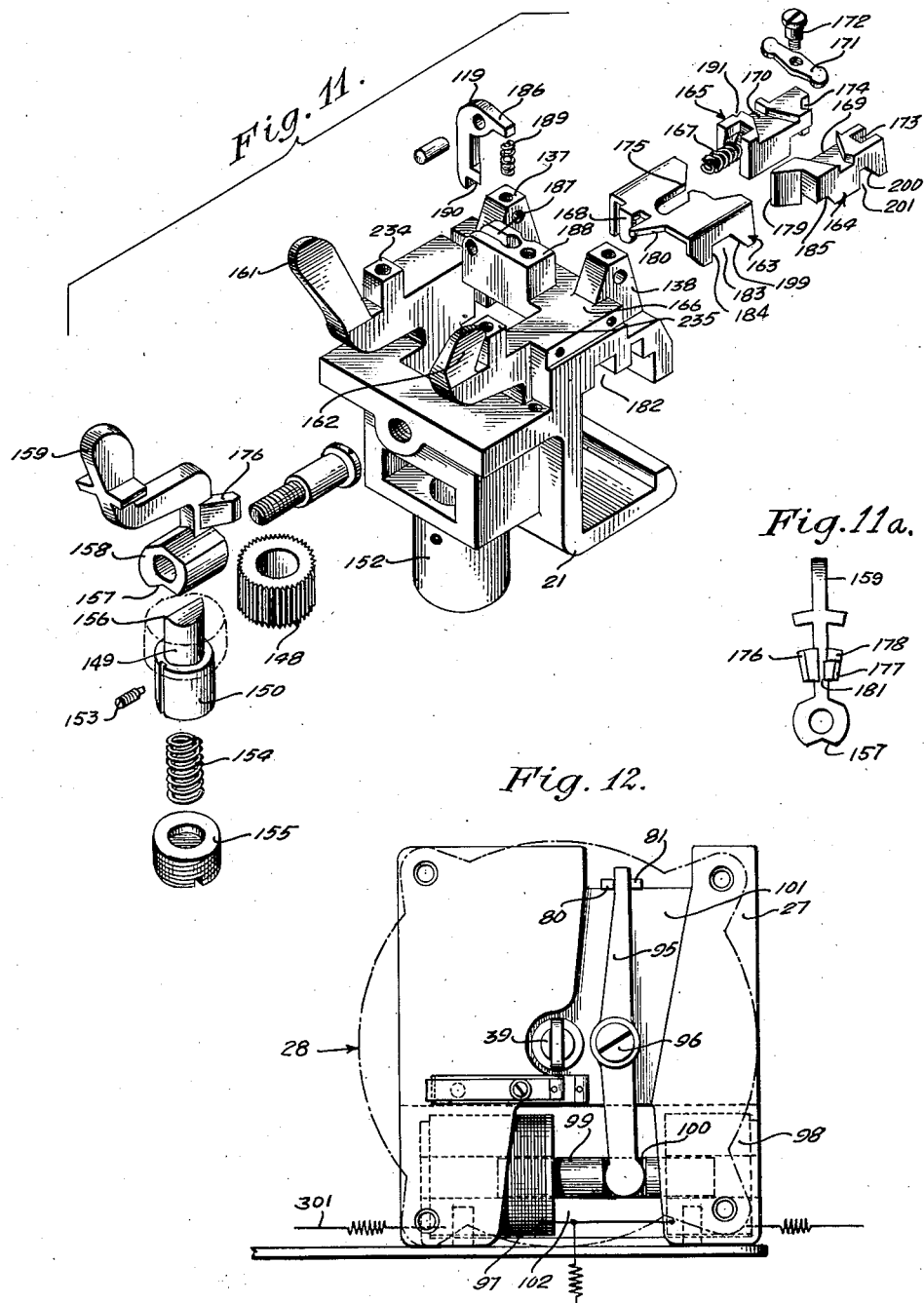

March 28, 1939.　　W. F. FEYRER　　2,152,585
DICTATING MACHINE
Original Filed March 25, 1931　　18 Sheets-Sheet 8
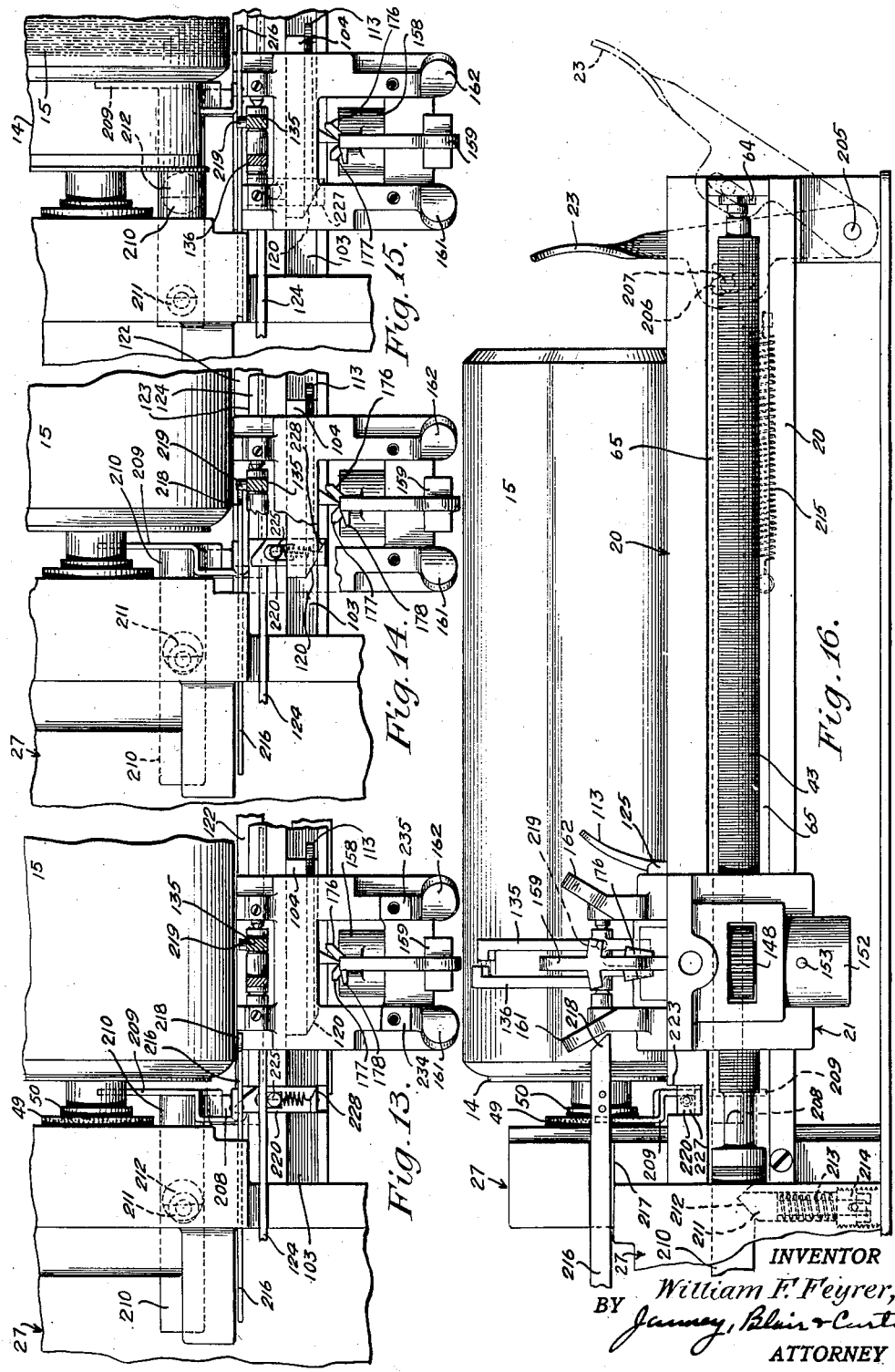
INVENTOR
*William F. Feyrer,*
BY *Janney, Blair & Curtis*
ATTORNEY March 28, 1939. W. F. FEYRER 2,152,585
DICTATING MACHINE
Original Filed March 25, 1931 18 Sheets-Sheet 9

INVENTOR
William F. Feyrer,
BY
ATTORNEY

March 28, 1939.  W. F. FEYRER  2,152,585
DICTATING MACHINE
Original Filed March 25, 1931   18 Sheets-Sheet 10

INVENTOR
William F. Feyrer,
BY Janney, Blair + Curtis
ATTORNEY

March 28, 1939. W. F. FEYRER 2,152,585
DICTATING MACHINE
Original Filed March 25, 1931 18 Sheets-Sheet 11
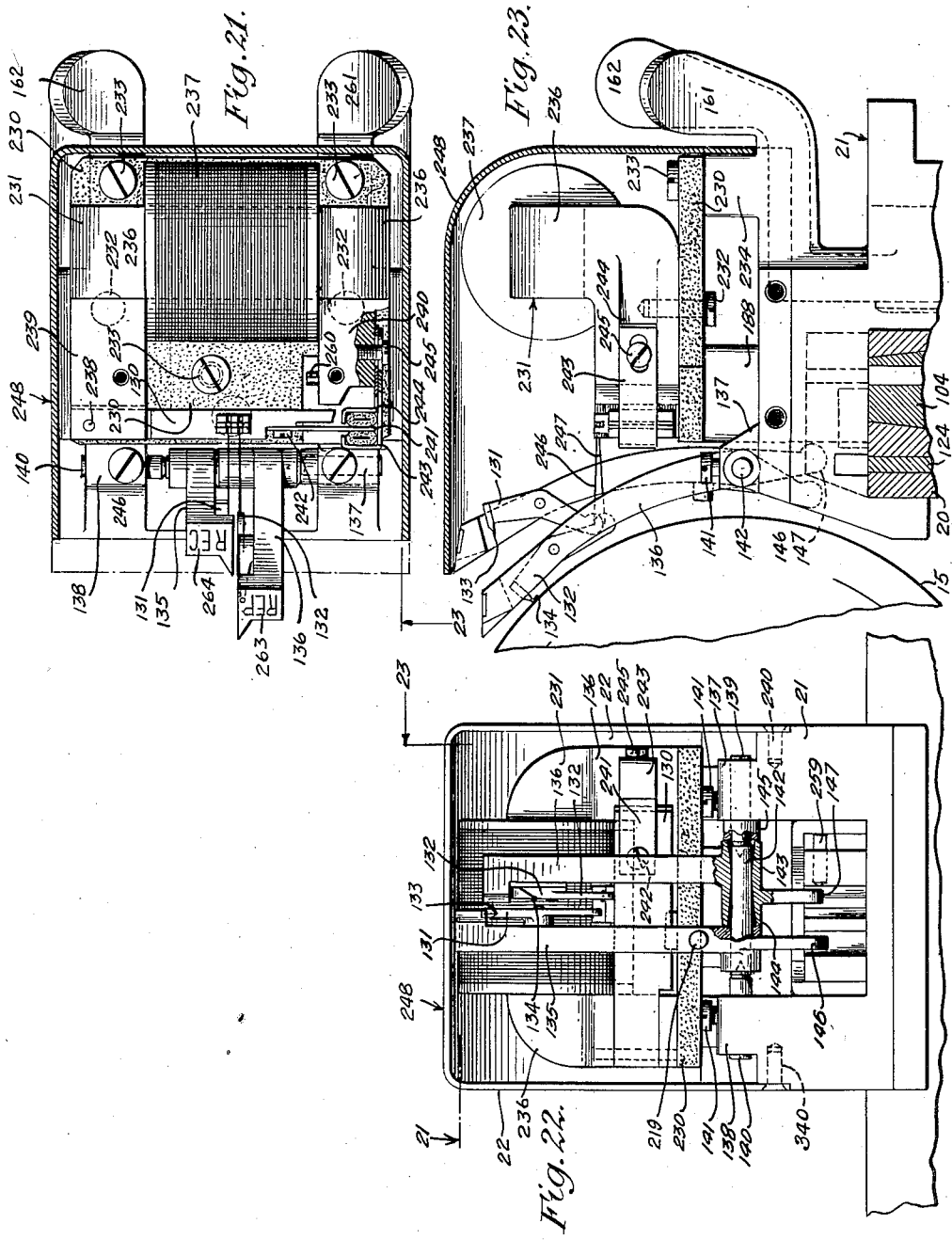
INVENTOR
William F. Feyrer,
BY Janney, Blair & Curtis
ATTORNEY

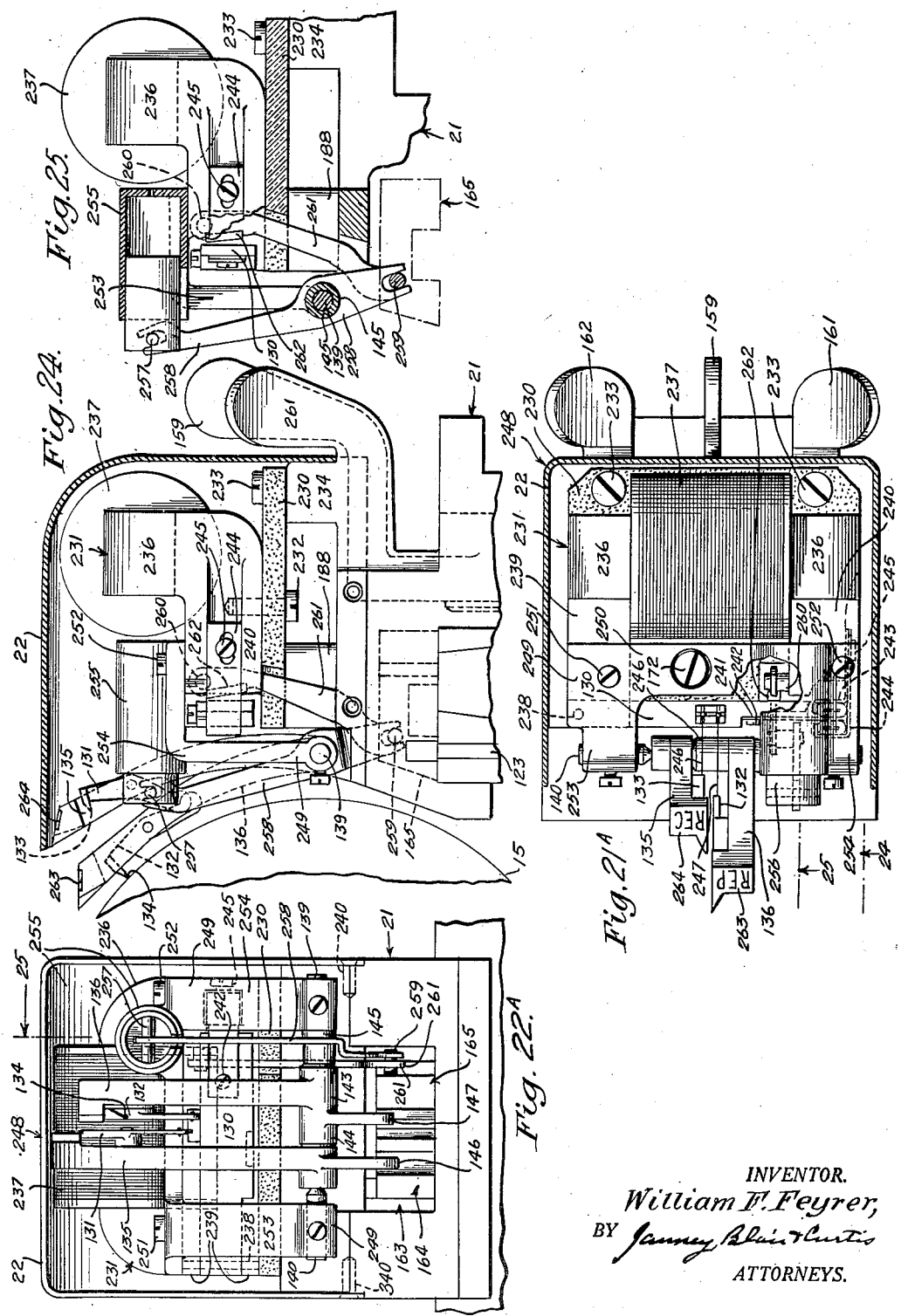

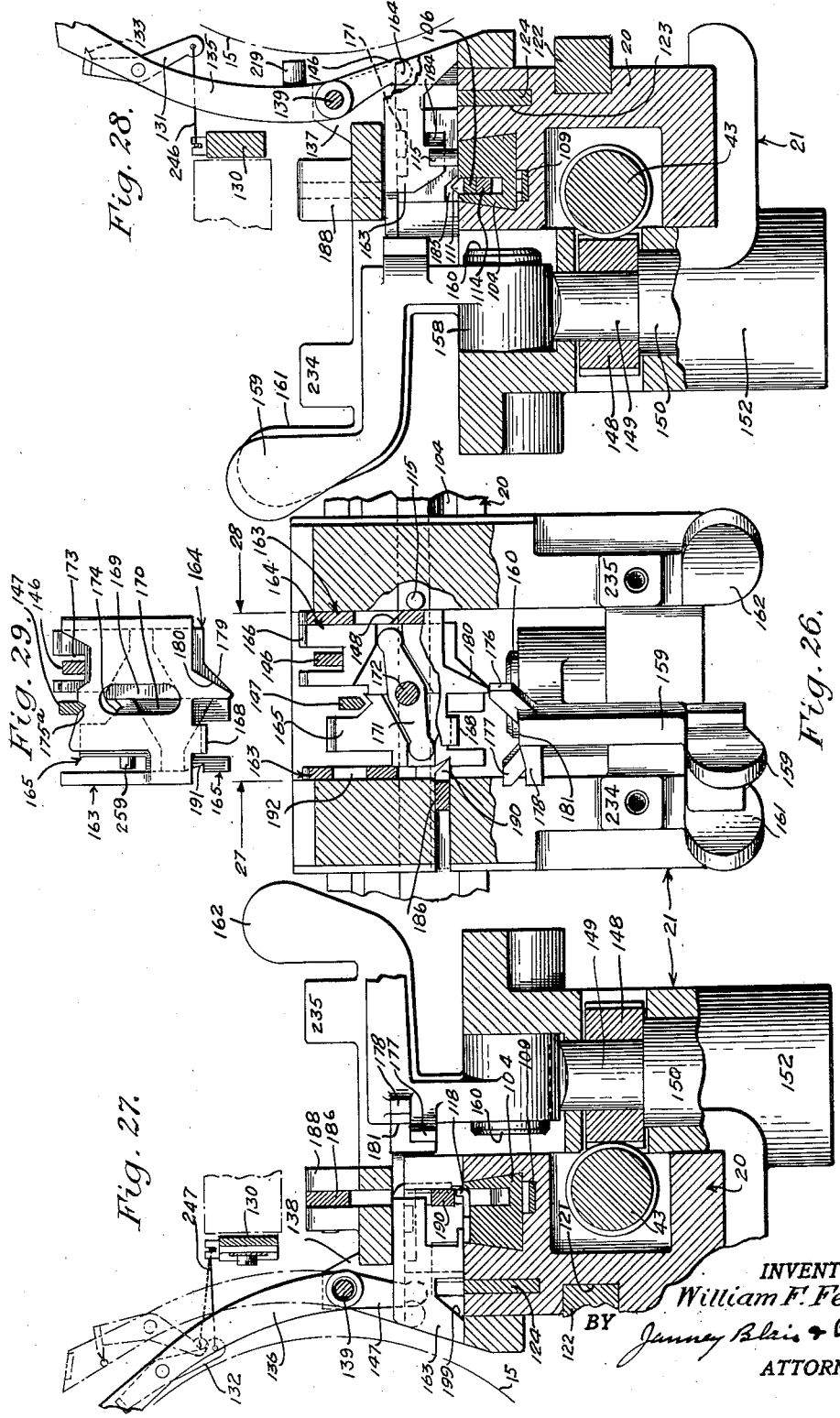

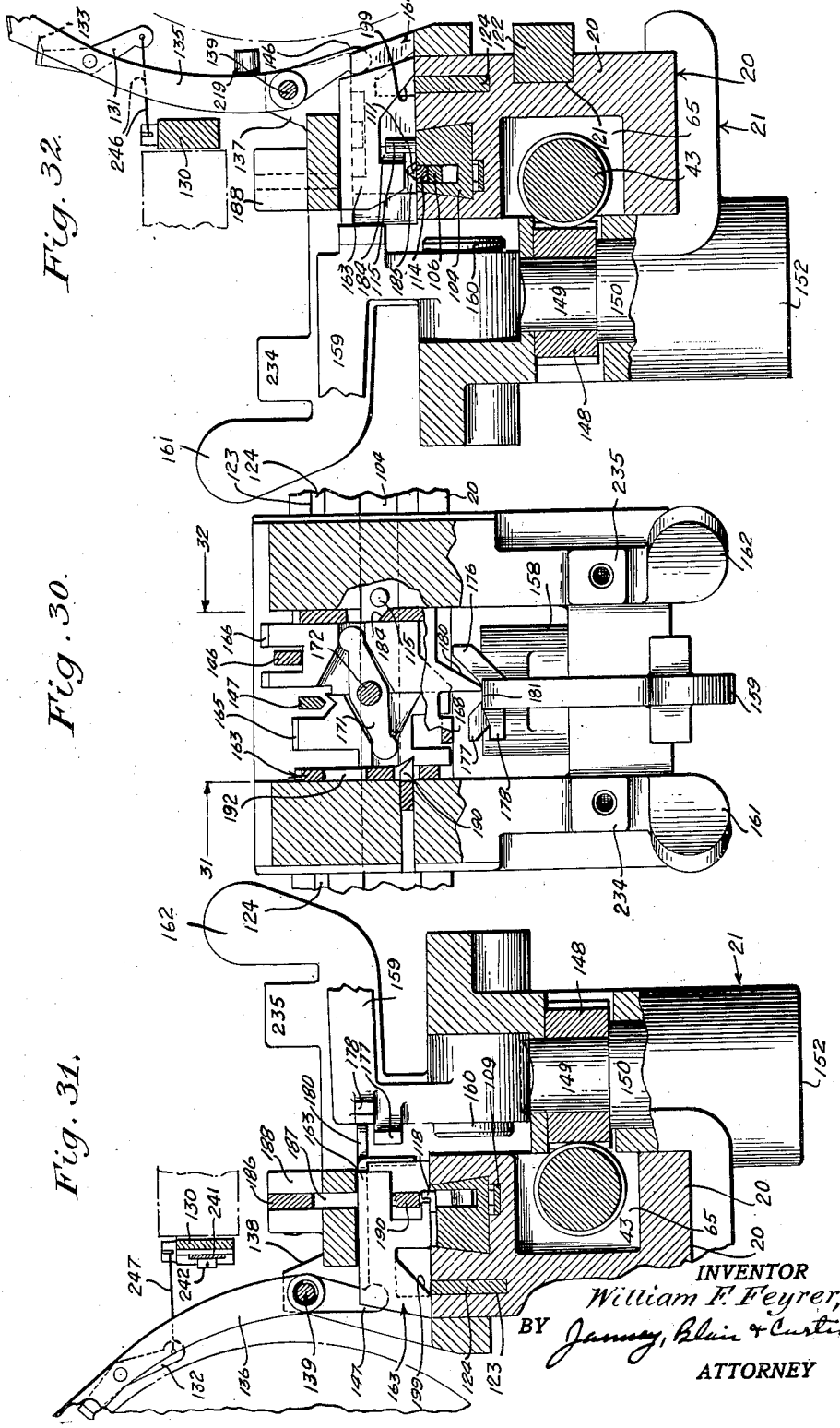

March 28, 1939. W. F. FEYRER 2,152,585
DICTATING MACHINE
Original Filed March 25, 1931 18 Sheets-Sheet 15
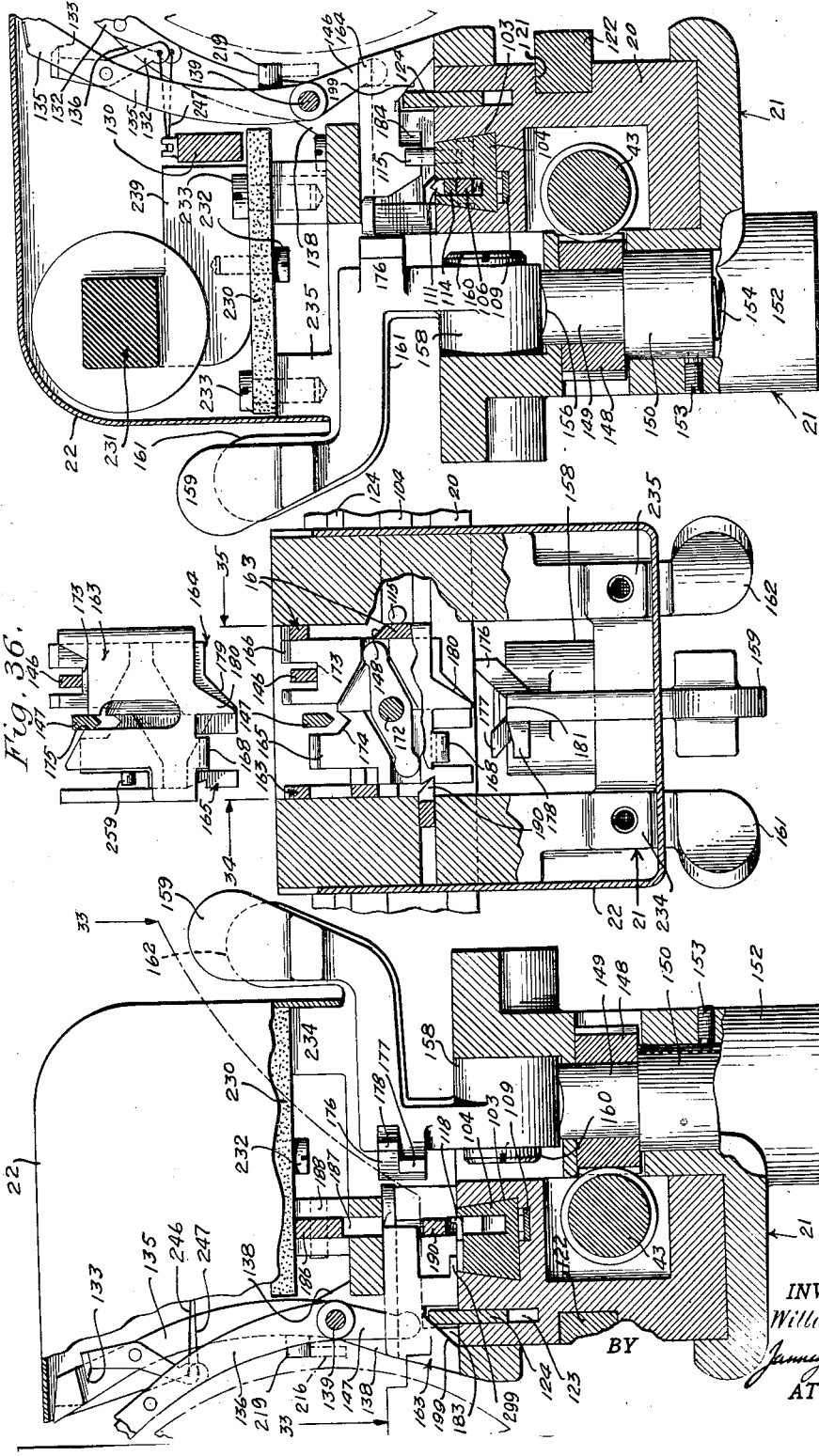
INVENTOR
William F. Feyrer,
BY
ATTORNEY March 28, 1939. W. F. FEYRER 2,152,585
DICTATING MACHINE
Original Filed March 25, 1931 18 Sheets-Sheet 16
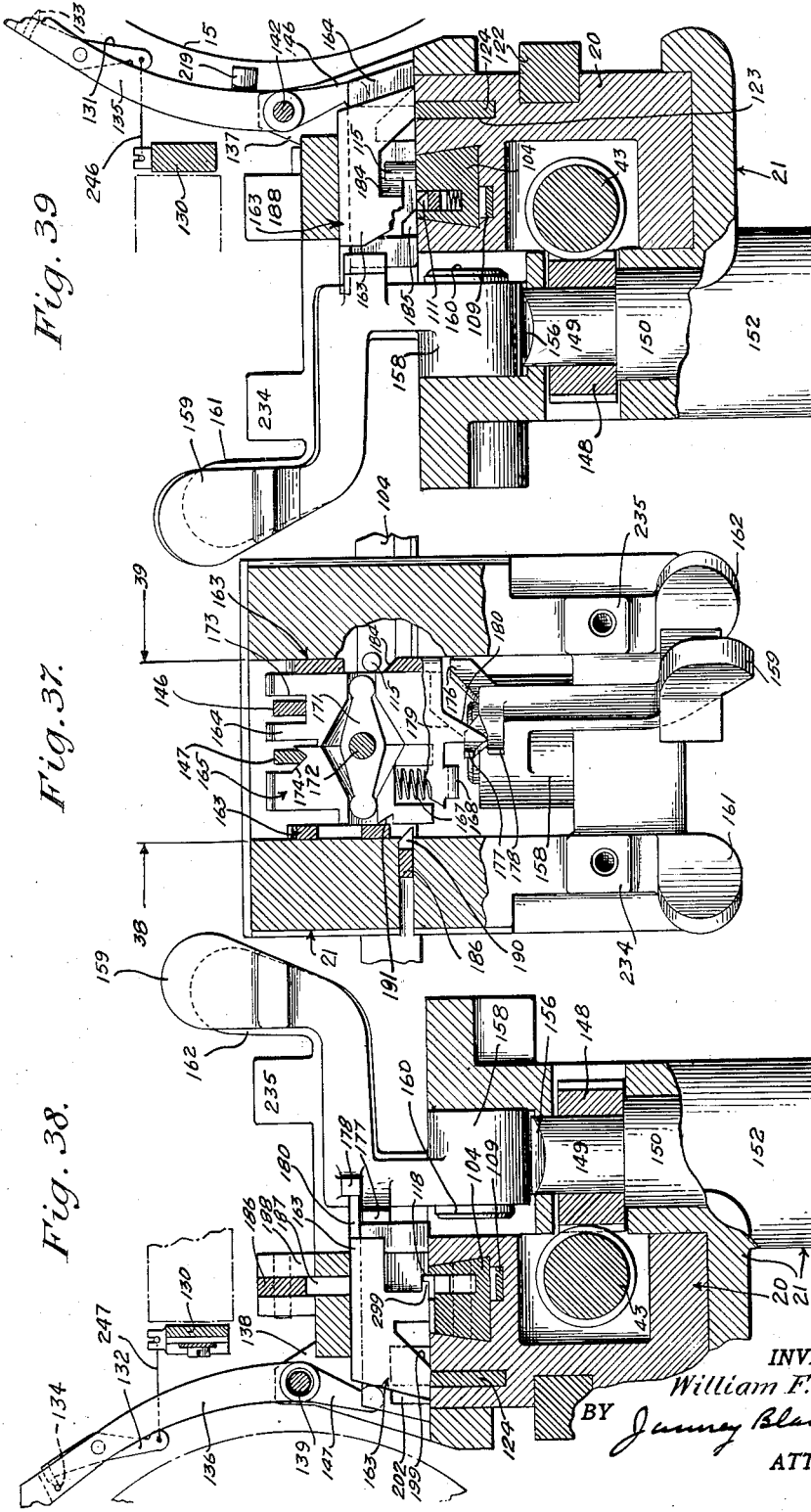
INVENTOR
William F. Feyrer,
BY Janney Blair & Curtis
ATTORNEY March 28, 1939.  W. F. FEYRER  2,152,585
DICTATING MACHINE
Original Filed March 25, 1931  18 Sheets-Sheet 17
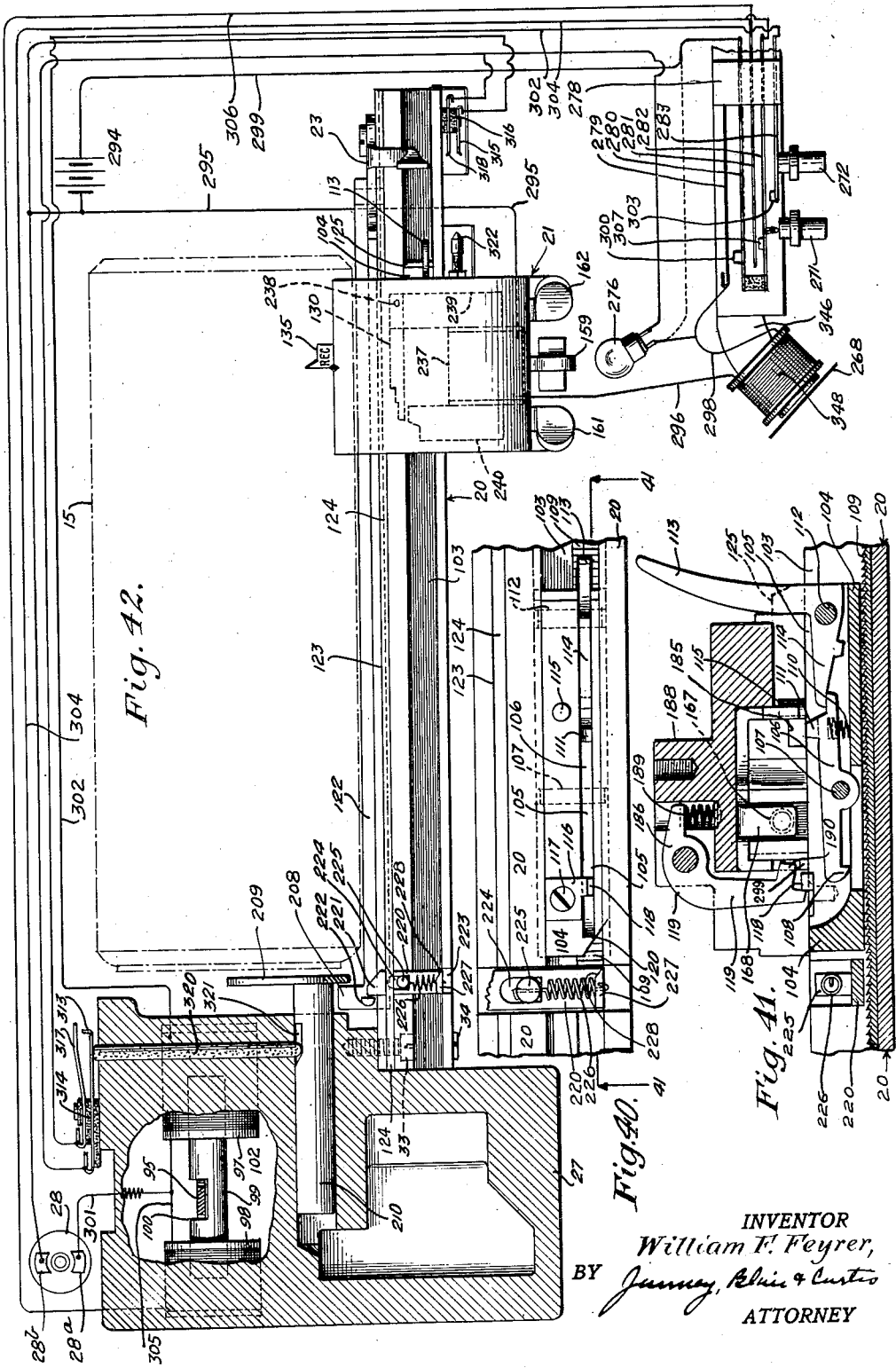
INVENTOR
William F. Feyrer,
BY Janney, Blain & Curtis
ATTORNEY March 28, 1939. W. F. FEYRER 2,152,585
DICTATING MACHINE
Original Filed March 25, 1931 18 Sheets-Sheet 18
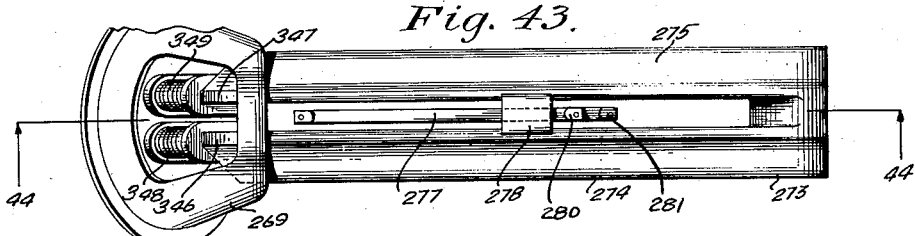
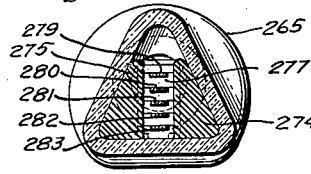
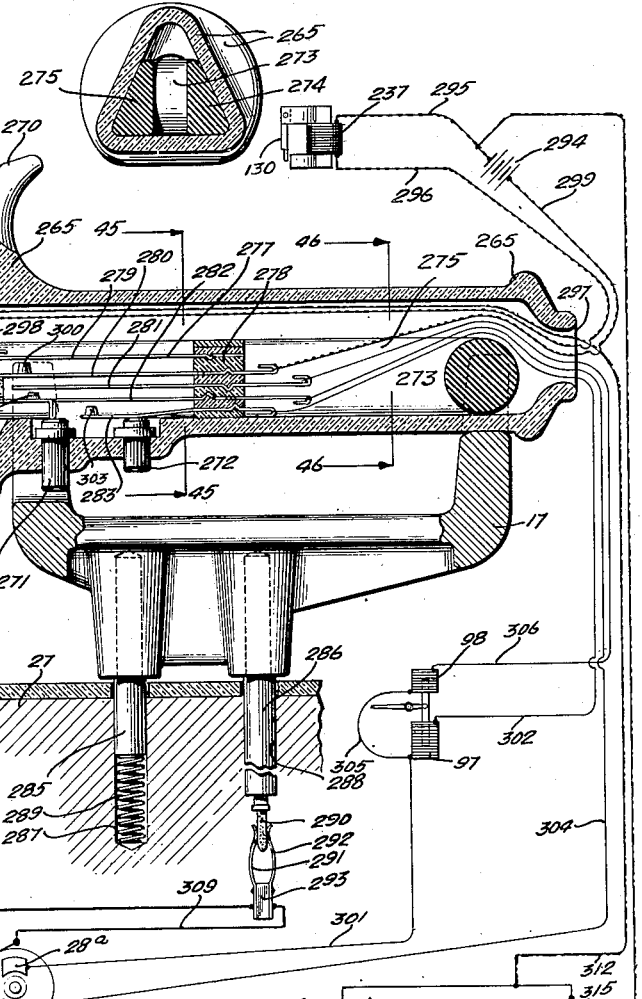
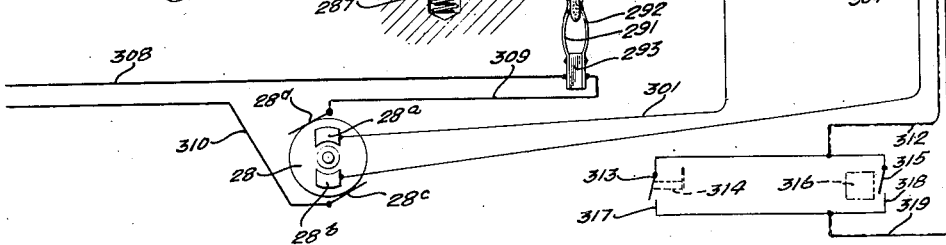
INVENTOR
William F. Feyrer,
BY
ATTORNEY Patented Mar. 28, 1939

2,152,585

UNITED STATES PATENT OFFICE 2,152,585

DICTATING MACHINE

William F. Feyrer, Norwalk, Conn., assignor to Dictaphone Corporation, New York, N. Y., a corporation of New York Application March 25, 1931, Serial No. 525,172
Renewed October 3, 1938

91 Claims. (Cl. 274—17)

This invention relates to phonographs and more particularly to machines for recording and reproducing dictation.

One of the objects of the invention is to provide a machine of the above nature which is practical and highly efficient. Another object is to provide a machine of the above nature which is rugged, sensitive and dependable even under the most severe operating conditions.

Another object is to provide a machine of the above nature which is of simple and compact construction. Another object is to provide a machine of the above nature which is convenient to assemble, adjust and repair.

Another object is to provide a machine of the above nature which is convenient to operate. Another object is to provide a machine of the above nature controllable by means of a unit control mechanism to perform all functions relating to recording dictation, resetting for the purpose of reproducing dictation, and reproducing dictation.

Other objects will be in part obvious and in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawings, in which are shown one or more of the various possible embodiments of this invention, Fig. 1 is a perspective view of a dictating machine made according to the present invention.

Fig. 2 is a perspective view similar to Fig. 1 but shows the machine with its shield or mask removed.

Fig. 3 is a front elevation thereof.

Fig. 4 is a top plan view showing the carriage in its initial or starting position at the extreme left of its support, a portion of the rear part of the machine being broken away. This view shows the drive and feed mechanism, with start-and-stop control and backspace control in neutral or inoperative positions.

Fig. 5 is a disconnected detail view of portions of the record-ejecting mechanism.

Fig. 6 is a top plan view similar to Fig. 4 showing the carriage in a more advanced position and, as indicated by the arrow, conditioned for backspacing, the backspace control mechanism also being shown in operative backspacing condition.

Fig. 7 is a partial front elevation with the parts in the same condition as in Fig. 6, part of the figure being in cross section through the housing on line 7—7 of Fig. 6.

Fig. 8 is a disconnected top plan view of the start-and-stop and backspace or reverse feed control levers. In this view the start-and-stop lever is shown in operative position to produce mandrel rotation and forward carriage feed, while the backspace lever is in its inoperative position.

Fig. 11 is an exploded perspective view of the carriage for the recording and reproducing mechanism, showing in detail the various operating parts belonging thereto and indicating the positions they would occupy when assembled.

Fig. 11A is a rear elevation of the stylus control or state control lever, a front and side perspective view of which is seen in Fig. 11.

Fig. 12 is a rear elevation of the housing for the drive and feed mechanism, the driving motor being removed, and showing the electromagnetic control for said mechanism.

Fig. 13 is a fragmentary plan view of a portion of the machine with the carriage moved slightly away from its initial position and showing the ejector-locking means in operative position to prevent operation of the record-ejector.

Fig. 14 is a view similar to Fig. 13 but showing the carriage in its initial position and the ejector-locking means retracted to release the record-ejector for operation.

Fig. 15 is a view similar to Figs. 13 and 14, showing the record-ejector moved to its outmost position, with the record in the position it would occupy before removal by the operator.

Fig. 16 is a front elevational view with the carriage moved away from its initial position and disclosing certain features of the ejector mechanism.

Each of these last four views shows the carriage parts in their normal recording position.

Fig. 21 is a top plan view of applicant's combination electromagnetic recorder and reproducer, or vibration translation unit, the cover being cut away as indicated on line 21 in Fig. 22.

Fig. 22 is a rear elevation of the electric translation unit shown in Fig. 21 and shows also the upper part of the sound-box carriage.

Fig. 23 is a side elevation thereof partly in section on line 23 of Figs. 21 and 22.

Fig. 21A is a view similar to Fig. 21, but shows certain modifications and additions.

Fig. 22A is a view similar to Fig. 22, but shows the modifications as in Fig. 21A.

Fig. 24 is a cross section and side elevation taken on line 24 of Fig. 21A.

Fig. 25 is a view similar to Fig. 24 but with parts omitted and other parts shown in section substantially on line 25 of Figs. 21A and 22A.

Figure 19:
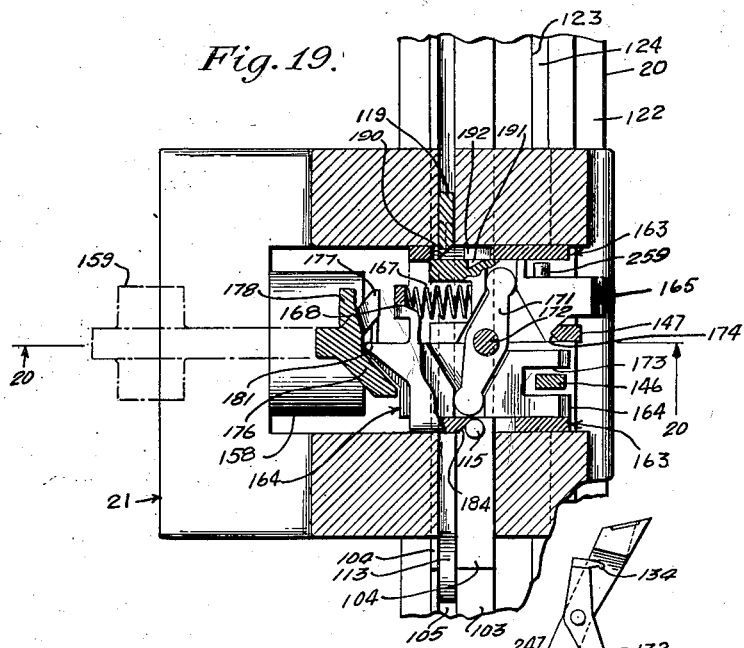
Fig. 19 is a sectional view taken substantially on line 19—19 of Figs. 18 and 20.

Fig. 26 is in part a plan and in part a sectional view of the carriage, similar to Fig. 19, but showing the operating parts in the positions they occupy when the carriage is free to be moved to the left, or back-spaced, by hand in preparation for reproduction of a portion of the matter previously recorded.

Fig. 27 is a cross section taken substantially on line 27 of Fig. 26 but with certain parts, as the feed-nut, shown in section on the transverse center line of the carriage.

Fig. 28 is a cross section taken substantially on line 28 of Fig. 26.

Fig. 29 is a detached view of the carriage slide assembly, illustrating one form of the major or state control slide, and the different slide members in the relative positions occupied by them in Fig. 26.

Fig. 30 is a top plan view of the carriage partly in section similar to Figs. 19 and 26, but showing the various operating parts in what may be termed locked reproducing position.

Fig. 31 is an elevation and section taken substantially on line 31 of Fig. 30.

Fig. 32 is an elevation and section taken substantially on line 32 of Fig. 30.

Fig. 33 is a plan view and section taken substantially on line 33—33 of Fig. 34, similar generally to Fig. 26 but showing the various operating parts in the positions they assume when the drive mechanism and controls are actuated for automatic or power backspacing.

Fig. 34 is a partial elevation and section taken on line 34—34 of Fig. 33.

Fig. 35 is a partial elevation and section taken on line 35—35 of Fig. 33.

Fig. 36 is a detached view of a carriage slide assembly showing a preferred form of major slide, and the different slide members in the relative positions shown in Fig. 33.

Fig. 37 is a partial plan and section of the carriage, similar to Figs. 19, 26, 30 and 33, but showing the operating parts in the positions they occupy when the operator moves the carriage by hand back to initial position in order to remove a record-cylinder from the mandrel.

Fig. 38 is a partial elevation and section taken substantially on line 38—38 of Fig. 37.

Fig. 39 is a partial elevation and section taken substantially on line 39—39 of Fig. 37.

Fig. 40 is a fragmentary enlarged plan view of a portion of the carriage support showing in detail certain features of the invention.

Fig. 41 is a longitudinal cross section taken substantially on line 41—41 of Fig. 40, and includes certain parts of the carriage in fragmentary cross section.

Figure 10:
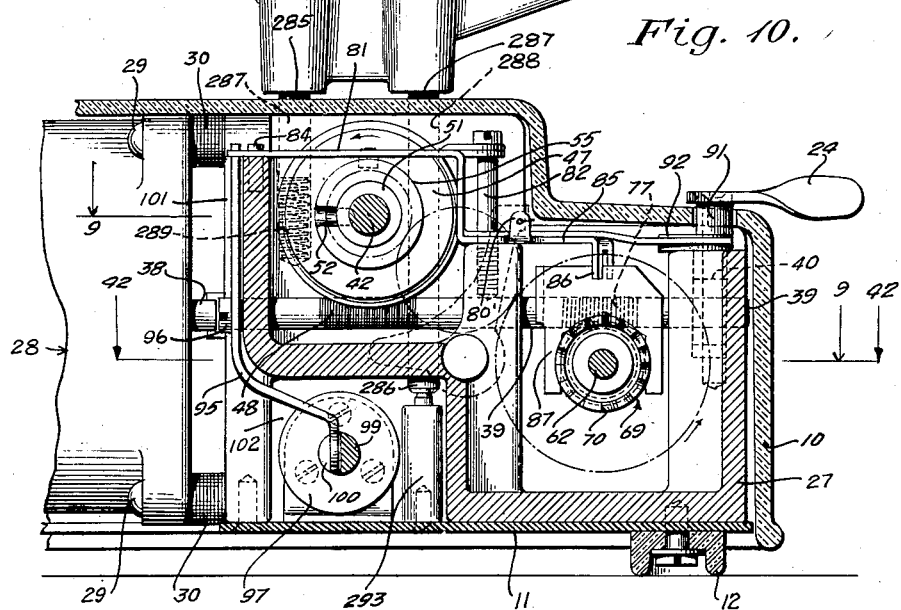
Fig. 10 is a transverse section of the drive and feed mechanism taken through the housing, substantially on line 10—10 of Fig. 9.

Fig. 42 is in part a section on line 42—42 of Fig. 10 and in part a semi-diagrammatic view of nearly all of the electrical features of the present invention, and the circuits associated with them.

Fig. 43 is a plan view of the combination receiver and transmitter body removed from the hand unit casing and showing start-and-stop and backspace switch assembled therewith.

Fig. 44 is a sectional view taken on line 44—44 of Fig. 43 showing the transmitter and receiver unit and its casing in cross section, and mounted in its cradle upon the machine. This view also shows diagrammatically the various electrical circuits of the present invention.

Fig. 45 is a sectional view taken on line 45—45 of Fig. 44; and

Fig. 46 is a sectional view taken on line 46—46 of Fig. 44.

Similar reference characters refer to similar parts throughout the different views of the drawings.

Figure 1:
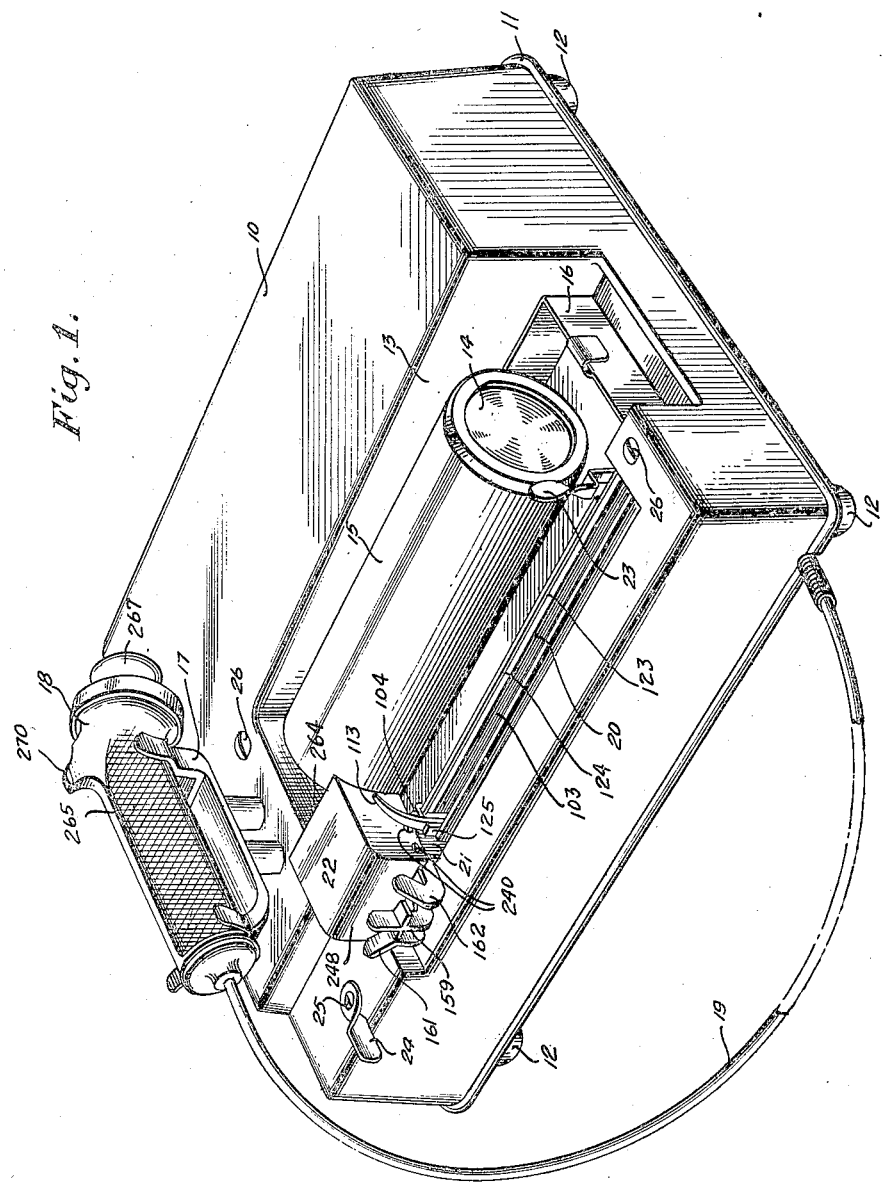

Referring to the drawings for a general description, and first to Fig. 1, it will be seen that this novel commercial phonograph, or dictating machine, presents an outward appearance of great simplicity and compactness. Practically all of the mechanism and operating parts are encased completely, protecting them against injury and the accumulation of dust by a shield or mask member 10 fitting down closely upon a base plate 11, which is itself mounted upon four foot members or pads 12, composed of rubber or any suitable material. Extending substantially centrally and longitudinally of the mask is a bottomless pocket 13 within which is positioned the mandrel 14. A record-cylinder 15 is shown mounted upon the mandrel and beneath the same a chip tray 16, easily removable for disposition of the chips or shreds removed from the record-cylinder during recording. At the left end of the machine is mounted the cradle 17 for supporting the telephone hand unit 18, connected by means of an encased cable member 19 with the various electrical features of the machine enclosed within the casing, as will appear more fully when these features are specifically described.

This view also shows the carriage bar or support 20 and, mounted thereon, the carriage 21 and vibration translation unit 22. This translation unit comprises a combined electric recorder and reproducer, which will be more fully described hereinafter. At 23 is shown a finger lever for actuating the record-ejector mechanism, and 24 indicates a finger lever for manually controlling the operation of the start-and-stop and reversing mechanism. It will be noted that the cradle 17 may be removed bodily from the machine, that the operating lever 24 may be taken off by first removing a screw 25, and that then, upon removal of screws 26, the complete shield 10 may be lifted off to expose substantially all of the operating parts of the machine, which will then be readily accessible for cleaning or adjustment.

Referring to Fig. 2, it will be seen that substantially all of the operating parts of the machine lie substantially in a single working plane. Mounted upon the base plate 11 at the forward lefthand corner thereof is a block 27, which will be hereinafter referred to as the housing, and which encloses and mounts substantially all of the mechanism employed to drive and control the operation of the mandrel and the carriage feed. Rearwardly of this housing is supported a motor 28 which may be resiliently supported by the housing itself by means of studs 29 and resilient sound and vibration proof washers 30 or, alternatively, may be seated upon the base plate itself and attached directly thereto. Near the forward part of the machine there is shown the carriage bar 20, supported at one end upon a bracket member 31, secured to the base plate by suitable screws 32, and at the other fastened to the housing by means of studs 33 and 34, best shown in Fig. 42. This bar is machined to provide certain guides and recesses more fully described hereinafter, and slidably mounted thereon is the carriage 21 adapted to travel from its extreme left or initial position, as shown in Fig. 2, in an outward or righthand direction toward the end of the record mandrel. At 35 in Fig. 2 is shown a suitable plug for connecting the machine motor to a standard house lighting circuit, or other source of electric power. At 36 is shown a block for supporting the various wires and cables making up the different electrical circuits of the machine. The rectagonal figure shown in broken lines at 37 indicates a storage battery for producing a source of speaking current for the recording and reproducing devices of the machine; or, if desired, a power-pack may be employed, and situated in the position indicated.

Drive and feed mechanism

Referring to Fig. 4, the shaft 38 of the motor 28 is shown as suitably connected with a worm-shaft 39 extending transversely of the housing block 27 and suitably supported for rotation therein. This shaft is supported against end play by any suitable thrust collar 40, secured thereto by means of a set screw 41 and mounted within a recess 78 formed in the housing. The worm-shaft crosses the interior of the housing at a level below that of the mandrel shaft 42, and above the shaft end 62 of the feed-screw 43, as best seen in Fig. 10.

Figure 9:
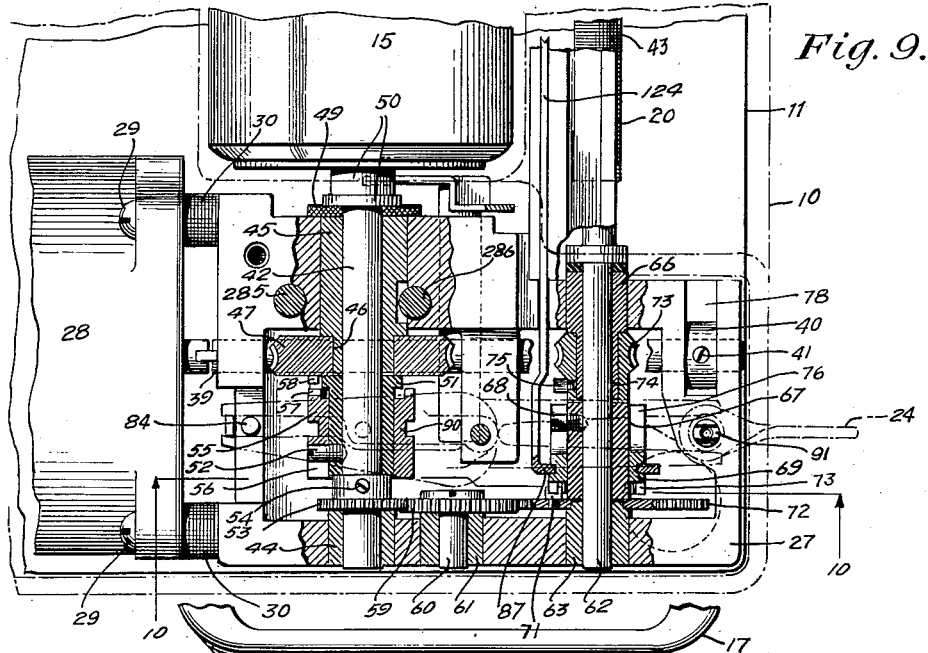
Fig. 9 is a view partly in plan and partly in horizontal cross section substantially on line 9—9 of Fig. 10, showing details of the drive and feed mechanism.

Mandrel shaft 42 is supported at its extreme left end in a bearing member 44, and also in the righthand wall of the housing by a bearing member 45. Bearing 45, see Fig. 9, is reduced as at 46 to provide a bearing for a worm wheel 47, which is freely rotatable thereon and is in constant operative engagement with a fine pitch worm portion 48 of the worm-shaft 39, as is clearly shown in Fig. 10. A suitable washer 49 is interposed between the right end of bearing 45 and a collar 50 on the mandrel shaft, and by its engagement with the side of the housing limits endwise movement of the mandrel shaft toward the housing. Fixed upon the mandrel shaft 42 by means of a set screw 52 is a stop collar 51, which serves to hold the worm wheel 47 on its bearing and limits endwise movement of the mandrel shaft in a direction away from the housing.

A small driving gear 53 is mounted on the mandrel shaft adjacent the bearing 44 and is held in fixed relation thereto by means of a set screw 54. In order to transmit motion from the worm wheel 47 to the mandrel shaft and thus rotate both the mandrel and the pinion 53, a sliding clutch collar 55 is employed, as is clearly seen in Figs. 3 to 10 inclusive. This clutch collar is movable longitudinally upon the stop collar or sleeve 51, but is forced to rotate therewith by reason of the engagement of the aforesaid set screw 52 with the side of a slot 56 formed in the clutch collar. This collar is provided at its right end with ratchet-like teeth 57 adapted to be moved into engagement with a driver tooth 58 projecting outwardly from the side of the worm-gear 47.

Considering the drive mechanism as far as this point, it will be seen that the motor shaft constantly rotates the worm-shaft 39 to provide constant rotation of the worm wheel 47 when the motor is running. When the clutch collar 55 occupies its lefthand position, see Fig. 4, no motion of the mandrel shaft takes place, but when the clutch collar is moved to the right so that the cooperating clutch teeth engage, then the mandrel shaft partakes of the rotation of the worm wheel 47 and also this same motion is transmitted to the small pinion gear 53. Meshing with gear 53 is an intermediate gear 59 which is mounted for rotation upon a stud 60 held in a bearing member 61.

Referring particularly to Fig. 7, it will be seen that the feed-screw 43 is provided at its left end with a shaft portion 62, which is mounted for rotation in the housing by a bearing member 63 and is further mounted upon an adjustable pivot means 64 at the extreme right end of the carriage bar 20. The feed-screw fits in a recess 65 of the carriage bar and is also mounted for rotation in the inner or righthand wall of the housing by means of a bearing member 66. Surrounding the shaft portion 62 of the feed-screw, between the bearings 63 and 66, is a sleeve 67 fixed upon the shaft 62 by means of a set screw 68. This sleeve supports a clutch collar 69 which is prevented from relative rotation by means of the set screw 68, but which is slidable longitudinally of the sleeve and is provided at its lefthand side with teeth 70 adapted to engage a tooth 71 extending inwardly from a driving gear 72 which meshes with the above described intermediate gear 59. The gear 72 is mounted upon a reduced portion of the bearing 63 so as to be rotatable relatively to the screw shaft 62. Adjacent the opposite side of the clutch collar 69 a small worm wheel 73 is rotatably mounted upon a reduced extension portion 74 of the bearing member 66. Projecting from the hub of this worm-gear is a stud 75 which, when the clutch collar 69 occupies an extreme righthand position, engages with one of a plurality of slots 76 formed in the clutch collar 69. The worm-shaft 39 is provided with a worm portion 77 disposed in constant driving relation to the thread of the worm wheel 73. Thus, the worm wheel 73 constantly rotates when the motor is running but does not drive the feed-screw unless the collar 69 is moved to the right. As will be described shortly, this can only take place when the worm wheel 47 and mandrel clutch collar 55 are not in operative engagement, for whenever the mandrel clutch collar is in operative engagement with the mandrel worm wheel, as will be explained hereinafter, the feed-screw clutch collar teeth 70 are in engagement with the tooth 71 of the gear 72, which turns whenever the mandrel clutch collar is effectively positioned for rotating the mandrel. Thus, whenever the mandrel is caused to rotate, the feed-screw is likewise rotated in one direction, which direction is such as to produce forward feed of the carriage relatively to the mandrel shaft, and it is to be here noted, that the gear relation is such as to give a relatively slow turning of the feed-screw during the forward feed, and that the worm 77 is of a comparatively high pitch so as to produce a relatively rapid movement of the feed-screw and rapid movement of the carriage when the drive mechanism is reversed for backspacing. It will be readily apparent by an inspection of the gearing, as shown in Figs. 9 and 10, that the worm-gear 73 and the spur-gear 72 drive the feed-screw in opposite directions when they are operatively connected thereto.

Control of the operation of the mandrel shaft and feed-screw is accomplished by means of clutch shifting mechanism which will now be described.

Clutch control

The clutch control of the drive and feed mechanism comprises a start-and-stop lever 80 and a backspace or reverse lever 81 which are pivoted together like a pair of scissors and both pivotally mounted approximately in the central portion of the space within the housing 27 by means of a stud 82. They are normally held in the position shown in Fig. 4 by means of a spring 83 which is connected between ears 80' and 81' upturned respectively from the levers 80 and 81. This spring pulls the levers together until the movement is stopped by their rear ends engaging therebetween a stop pin 84 mounted upon the housing. In this position the mandrel shaft clutch member 55 will be disengaged with respect to the large worm wheel 47. Also, the feed-screw clutch member 69 will be out of engagement with the small worm wheel 73. Thus, in this position of the clutch members no motion will be transmitted from the worm-shaft 39 either to the mandrel or to the feel-screw. The forward arm of the lever 81 is provided with a lateral arm 85 which extends beneath the forward arm of the lever 80 and is turned downwardly at its end to form a bifurcated portion 86, best seen in Fig. 10. The bifurcated portion embraces a plate member 87 which extends downwardly into a groove 88 provided in the clutch collar 69.

The rearward arm of the clutch lever 80 is provided with a pin 89 engaging a groove 90 in the clutch collar 55. These connections between the levers 80 and 81 respectively with the clutch collars 55 and 69 provide means for shifting the said clutch collars when the levers are suitably swung about their pivot 82, either to start the machine for recording, to stop the machine, or to reverse the rotation of the feed-screw to produce return or backspace movement of the carriage.

With the clutch levers in the position shown in Fig. 8, the mandrel will be turned by engagement of the clutch teeth 57 with the tooth 58 upon the large worm wheel 47, and rotation of gears 53, 59 and 72 will take place. It is to be particularly noted that whenever the lever 81 stands in its normally biased position with its rearward end against the stop 84, the clutch collar 69 is brought into operative relation with the said gear 72. It follows, therefore, that the feed-screw rotates in its counter-clockwise direction, as indicated by the arrow in Fig. 10, whenever the mandrel shaft is caused to rotate as indicated in that figure. This rotation, as the feed-screw has a righthand thread, produces forward feed of the carriage.

In the position of the clutch levers shown in Fig. 6 the clutch collar 55 is withdrawn from engagement with the cooperating part upon the larger worm wheel 47, stopping rotation of the mandrel shaft and also stopping rotation of the feed-screw in its counter-clockwise direction. The movement, however, of the clutch lever 81 to its new position causes engagement of the clutch collar 69 with the stud 75 upon the sleeve of the small worm wheel 73, and results in a relatively rapid rotation of the feed-screw in the reverse direction rapidly to backspace the carriage.

The clutch levers just described provide for control of the machine manually by means of the fingerpiece 24 or electromagnetically by remote control, as will be hereinafter described. The fingerpiece 24, see Fig. 10, is mounted outside the mask 10 upon the upper end of a stud 91, upon which also is mounted an actuating arm 92, disposed between the forward ends of the levers 80 and 81. When the fingerpiece 24 is moved to the left, as seen in said Fig. 6, the member 92 is swung to the right, moving the lever 81 around its pivot to the position shown in Fig. 6, that is, into position to reverse rotation of the feed-screw. When the fingerpiece 24 is moved to the right, it assumes the position shown in Fig. 8, holding the lever 80 in position to produce rotation of the mandrel shaft and rotation of the feed-screw in a direction to produce forward feed of the carriage. It will be noted that when in this last position a detent 93 engages a corresponding notch 94 in the lever 80 to retain the lever 80 in its operative starting position, even though the operator releases his hold of the fingerpiece 24.

In Figs. 4, 6 and 8 there is shown the upper end of a lever 95, which extends downwardly at the rear of the housing and is mounted to swing about a pivot 96, as best shown in Fig. 12. The upper end of this lever lies between the rearward ends of levers 80 and 81 and serves the same office as the fingerpiece 24 with its actuating arm 92, for upon the lever 95 being swung to the left in a counterclockwise direction, as shown in Fig. 12, the lever 80 will be moved to the position shown in Fig. 8, that is, the position for starting the machine for recording; but when the lever 95 is swung clockwise the clutch lever 81 is moved outwardly from its normal spring-biased position to the position shown in Fig. 6, when the parts are set for reverse operation of the feed-screw. Lever 95 is operable by remote control by means of two solenoids 97 and 98, to the armature 99 of which the lower arm of the lever 95 is operatively connected by means of the notch 100 formed in said armature. The electrical connections to and the manner of operation of the control solenoids 97 and 98 will be more fully described hereinafter. It is sufficient here to note the position of this unit, which is mounted in the lower part of the housing block 27 in a portion thereof exterior to the space within which the drive and control mechanism is located. This relation of parts will be clearly understood by reference to Figs. 9 and 10. In Fig. 12 the rear end of the block 27 is shown as being provided with a recess 101 within which the lever 95 is mounted, and an undercut portion 102 within which is received the solenoids. In this figure the position of the motor 28 is indicated in dot and dash outline.

Carriage bar

The carriage bar or support 20 has been hereinbefore referred to and its manner of attachment by means of screws to the housing 27 and to an end bracket 31 has been described. This bar extends longitudinally across the front of the machine to substantially the righthand end of the bottom plate and is provided in its front face with the recess 65 within which is mounted feed-screw 43, this feed-screw being substantially enclosed by the walls of the recess 65 and thus protected in a large measure from accumulations of dirt which might tend to clog the threads.

Cut into the upper surface of the carriage bar 20 and extending the full length thereof is a V or dovetail shaped slot 103 adapted to support and guide a farthest-advance or safety slide 104, best shown in Figs. 6, 18, 40 and 41. Slide 104 is recessed as shown at 105, and in this recess is mounted a pawl 106 pivoted at 107 and provided with an end 108 adapted to lock with the teeth of a rack member 105 secured to the carriage bar at the bottom of recess 103. The righthand end of pawl lever 106 is pressed upwardly by a spring 110 to engage 108 with the rack, and has an upwardly extending lug 111 adapted to project above the upper surface of the slide, and of the carriage bar, unless forced to the position shown in Fig. 41 by a member on the carriage to release the pawl from the rack, as will be more fully described hereinafter. A release lever is pivoted at 112 and is provided with a fingerpiece 113 and a pawl-operating arm 114 which overlaps the righthand end of pawl lever 106.

The fingerpiece 113 may be moved to the left to raise the pawl out of engagement with the rack, and enable the operator to shift the safety slide at will, independently of the carriage. Extending upwardly from the upper surface of the slide 104 is a stud 115 which is adapted to become engaged by certain of the carriage parts to advance the slide in its slot 103, as will be more fully described. There is also mounted upon the upper surface of this slide a plate 116 secured to the slide by a screw 117 and having a forwardly and upwardly projecting detent-actuating finger 118 adapted, under certain conditions, to engage the carriage detent 119 to release the detent; and under certain other conditions finger 118 is adapted to be engaged by a part of the carriage in order that the slide may be returned with the carriage when the latter is moved by hand to its initial position. This will all be clearly explained when the description and operation of the carriage and its stylus-controlling members is taken up. Slide 104 is also provided with a bevel operating surface 120 adapted to function in the release of an ejector lock, as will be made evident later.

Figure 18:
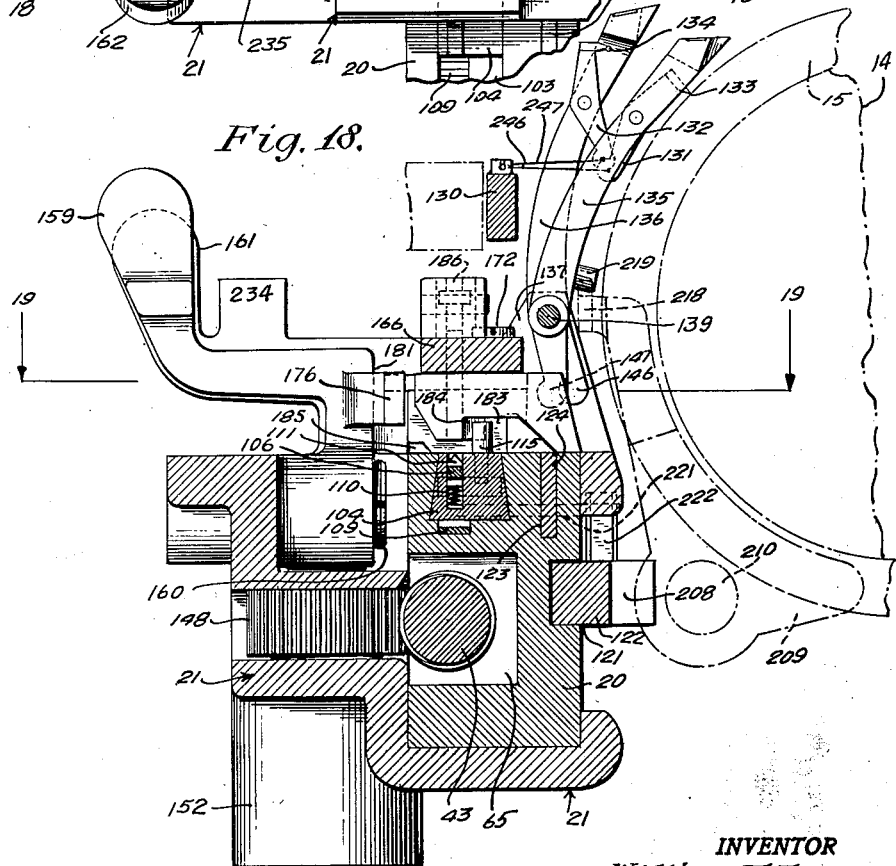
Fig. 18 is a cross section taken substantially on line 18—18 of Fig. 17.

The carriage bar 20 is further formed with a rectangular slot extending longitudinally of its rear surface indicated at 121, as may be clearly seen by reference to Figs. 2 and 18. In this slot is mounted for sliding movement a record-ejector operating link 122; and in a narrow slot 123 extending downwardly from the upper surface of the bar and extending longitudinally the full length thereof is mounted a sliding bar 124 which extends to the left through the wall of the housing 27, and at its inner end is bent downwardly to form the clutch operating plate 87, hereinbefore described.

It is to be noted that the carriage bar serves not only as a reliable mounting for the carriage, but in addition serves to support and house several important devices, through the functioning of which the operation of many of the carriage functions are rendered wholly automatic.

*Carriage with recording and reproducing mechanism*

Slidably mounted upon the carriage bar 20 is the carriage 21 for the vibration translation device employed for recording speech upon the record 15; and for reproducing dictation previously recorded. In the present embodiment of this invention the combined recorder and reproducer mechanism, which I have chosen to call a vibration translation device, is electromagnetically operated, as will hereinafter appear. For the present let it suffice to state that a vibratory armature is connected to transmit vibration to or from suitable styli, in the one case to produce a record upon the record-cylinder, and in the other to reproduce dictation or other matter previously recorded. For a comprehensive view of this assembly, reference is here made to Fig. 18, which shows the vibratory armature at 130, connected by means of wires or rods 246 and 247 capable of transmitting vibration, to a pair of small levers or stylus carriers numbered respectively 131 and 132. Carrier 131 is provided with a recording stylus 133, while carrier 132 is provided with a reproducing stylus 134. Each of these carrier levers is pivotally mounted, as shown, near the upper end of a weight lever numbered respectively 135 for the recording stylus and 136 for the reproducing stylus. For a clear showing of the way in which these stylus weight levers are mounted, reference should be had to Fig. 22 which shows a rear view of the translation unit and a portion of the carriage with parts in cross-section. In connection with this view, attention should be given to Fig. 11 showing an exploded or disintegrated view of the carriage and its parts. The carriage frame 21 is shown as having two upwardly extending standards 137 and 138 disposed in alignment near the rear upper edge of said frame. In standard 137 there is adjustably mounted a pivot or male center member 139, and in the standard 138 is mounted a male center member 140. These are adjustable toward and away from each other and held in such adjustment by means of set screws 141. Supported for rotation between these centers, but without side play, is a short shaft 142; and tightly mounted upon the left end of this shaft, as viewed in Fig. 22, is the recorder weight lever 135. As thus mounted the recorder weight lever is free to oscillate in a vertical plane toward and away from the record-cylinder, but is incapable of lateral movement. On the other hand the reproducer weight lever 136 is mounted upon the short shaft 142 in such a way as not only to be capable of rocking to and from the record-cylinder but also to rock to a limited extent in a lateral direction, namely, longitudinally of the shaft 142. This is accomplished by providing the weight lever 136 with a relatively long hub 143, which hub has a bore constricted to a relatively tight fit of the shaft 142 at its center and belling out toward each end of the hub, as illustrated at 144. As stated above, this permits a limited lateral movement of the stylus carrier of the reproducing stylus in order that the stylus may accurately track the record while reproducing. This is necessary because unless provision is made for such lateral movement, the stylus may either get ahead of or behind its normal position to the carriage and feed-screw, in which case it is liable to jump out of the record groove instead of following it. However, no claim is directed broadly to means providing for this lateral motion. In order that the hub 143 may be properly held upon the shaft 142 without end play, the standard 137 is provided with a bushing 145, which bushing is adjustable lengthwise the pivot member 139 and may be held in any proper degree of adjustment by means of set screw 141. Lever 135 has at its lower end a suitably shaped abutment 146 and the reproducing lever 136 has at its lower end a suitably shaped abutment 147. These abutments are adapted to cooperate with slides movable in the carriage to swing the styli away from the record or to permit their return to the record surface. This is accomplished by swinging the weight levers about their common axis 142. The weight levers are so proportioned that while it is necessary to push their lower ends rearwardly to raise the styli from the record-cylinder, they will swing in the other direction to permit return of the styli to the record-cylinder under their own weight, when the slides cooperating with the abutment ends thereof permit.

Figure 17:
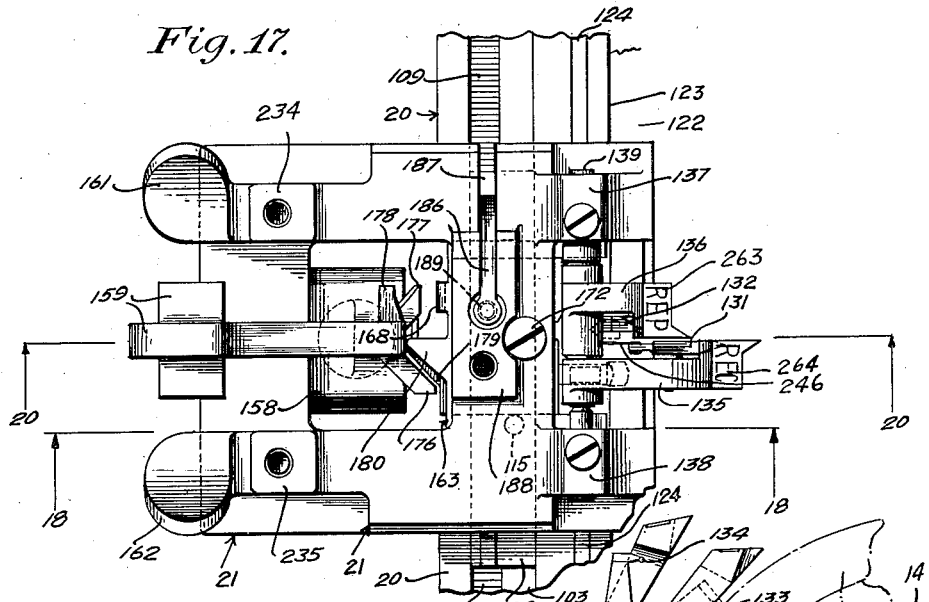
Fig. 17 is a top plan view of the carriage for the recording and reproducing mechanism, with the combination electric recorder and reproducer removed and with the various operating parts in their normal position, in which position the machine is ready to record dictation.
Figure 20:
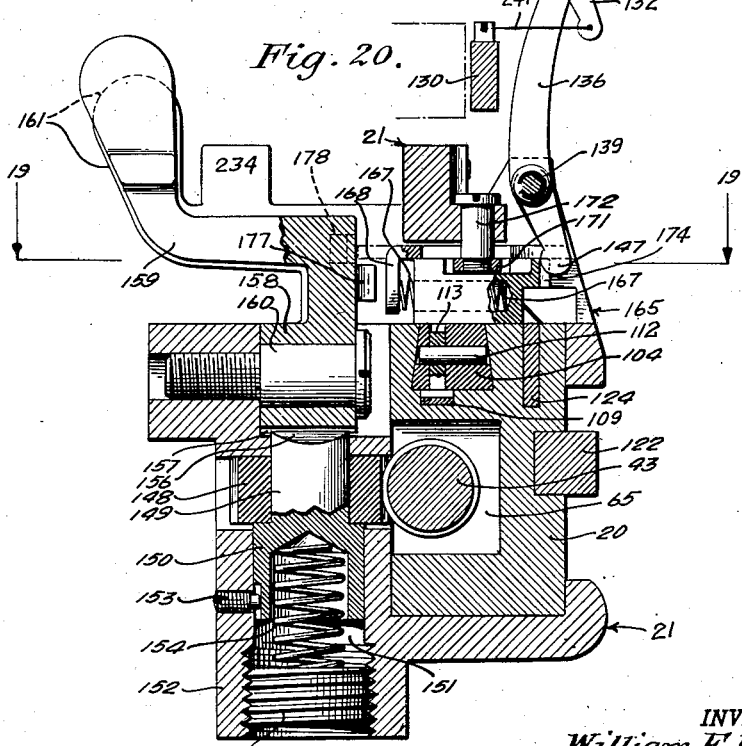
Fig. 20 is a sectional view through the carriage, taken substantially on line 20—20 of Figs. 17 and 19.

Returning to Figs. 11 and 18, the carriage frame member 21 is shown as a one-piece die casting which fits the carriage bar snugly but may slide freely along the bar. The feed-screw is shown at 43 in its recess 65 of the carriage bar, and in meshed engagement therewith is a circular feed-nut 148, which is mounted so as at all times to be enmeshed with the threads of said feed-screw. Referring to Fig. 20, the feed-nut 148 is mounted upon a journal portion 149 of a plunger 150 mounted for up and down movement in a vertical recess 151 formed in a downwardly extending boss 152 of the carriage frame. Plunger 150 is prevented from rotating by means of a set screw 153, and is normally biased in an upper position by means of a compression spring 154. The parts are retained in place and the compression of the spring is adjusted by means of a plug 155 threaded in the lower end of boss 152. At its upper end the plunger is beveled as shown at 156, and this bevel cooperates with an obtuse angular channel 157 formed in the lower part of the hub 158 of a lever 159. This lever, which will hereinafter be termed a state control lever, is mounted upon a horizontally disposed shoulder stud 160 threaded into a transverse bore of the carriage frame, so that the lever may have a limited oscillatory movement about its axis between two fixed finger grips 161 and 162, projecting forwardly and upwardly from the carriage frame. The feed-nut 148 is normally held in engagement with a shoulder formed on plunger 149 and also in engagement with the upper surface of the carriage recess, in which it fits, with sufficient friction to prevent rotation thereof. This is due to the effect of the spring 154. Also, the plunger tends normally by reason of its coaction with the recessed portion of the state control lever to hold that lever itself in the central position it occupies in Figs. 3 and 5. In Figs. 17 and 19 it is also shown in that central position. As the feed-nut is unable to rotate in this position of the parts, rotation of the feed-screw will produce travel of the carriage along the carriage bar. When, however, the state control lever is swung either to the right or to the left as viewed from the front of the machine, the plunger 149 is depressed, releasing the friction upon the feed-nut and permitting it to rotate freely about its axis. Under these conditions the carriage may be moved by hand in either direction, sliding freely along the carriage bar.

Three cooperating slides are provided for controlling the operation of the stylus weight carriers, and they form an assembly comprising an enveloping slide hereinafter to be referred to as the major slide 163, beneath which are mounted for relative sliding movement a recorder minor slide 164 and a reproducer minor slide 165. These slides are shown in assembled relation in Figs. 29 and 36, and in Fig. 19 and other views they are disclosed with portions of the major slide cut away. The whole assembly fits within a transverse passage of the carriage frame just beneath the deck 166 and they rest upon the top of the carriage bar, as is clearly shown in Fig. 20. The outer or major slide and the reproducer minor slide are normally held in a biased relation to each other by means of a spring 167 which fits in a socket in the forward end of the reproducer slide and abuts against an abutment lug 168 formed upon the major slide. This spring tends to press the reproducer slide rearwardly when the major slide is held against movement, and, obviously, when the reproducer slide is held against movement, tends to force the major slide toward the front of the carriage. The two minor slides 164 and 165 are provided on their upper surfaces with cooperating seats 169 and 170, Fig. 11, adapted to receive an equalizer or rocker-bar 171, which is held in place by a shouldered screw 172 adapted to pass through an aperture in the upper deck of the carriage and to be threadedly connected with the rocker-bar 171. The effect of this member 171 is to determine the relative positions of the slides 164 and 165, so that when one thereof occupies a forward position, the other will occupy a rearward position, or they may both occupy a central position, as indicated in Fig. 37. Slide 164 is provided with a notch 173 in its rear wall adapted to coact with the abutment end of the recorder weight lever 135, and the slide 165 is provided with a notch 174 in its rear wall adapted to coact with the abutment end of reproducer weight lever 136. The major slide 163 in its preferred form is also provided with a notch and passageway 175, which is also adapted to cooperate with the abutment end of the reproducer weight lever to prevent lateral movement of the weight lever when the slides are conditioned for backspacing movement of the carriage; for when so conditioned the recording stylus, which is normally biased to rest upon the record-cylinder, is lifted therefrom and the reproducing stylus, normally conditioned to be clear of the record-cylinder, is thrust forwardly into contact with said cylinder. Consequently, it is necessary that the reproducing stylus lever be held against lateral movement during backspacing in order that the reproducing stylus may be properly positioned or centered at the end of the backspacing movement for performing its reproducing function. With the form of major slide shown in Figs. 11 and 36, which is the preferred form, the reproducer weight lever is held against lateral movement during the backspacing operation but may swing far enough toward the record-cylinder to bring the reproducer stylus into engagement therewith. In Fig. 29 a modified form of major slide is shown in the use of which the reproducer weight lever engages a notch 175a formed in the rear wall of the major slide, and when such a major slide is used the reproducer stylus is not only held against lateral movement, but is raised slightly from the record surface.

As stated above, when the state control lever 159 occupies its central position the major slide and the recorder minor slide occupy a forward position while the reproducer slide occupies a rearward position. These positions of the slides are clearly shown in Figs. 17 to 20 inclusive, wherein the recording stylus 133 is shown in position to record and the reproducing stylus is held in a lifted position. The state control lever is provided with slide camming devices comprising a relatively long wing 176 extending rearwardly and to the right of the transverse center line of the carriage, as viewed from the front of the machine, a relatively shorter wing 177 extending rearwardly and to the left of the center line of the carriage as seen from the front of the machine, and a wing 178 which juts out to the left at substantially a right angle to the said transverse center line. The rear inclined surfaces of these wings, together with the low space between them, comprise camming surfaces adapted to cooperate with a beveled projection 179 extending forwardly on the recorder minor slide 164, and a tapered projection 180 extending forwardly from the major slide 163.

When the state control lever is in central position both of these projections lie in the low portion 181 of the camming device. When, however, the state control lever is swung to the left, as shown in Fig. 26, the major slide and the recorder minor slide are forced rearwardly by wing 176 against the tension of the spring 167, and the rocker-bar 171, at the same time, forces the reproducer slide into a forward position. Again, if the state control lever is moved to the right, the camming wing 177 will move the recorder minor slide to a midway position as shown in Fig. 37 and the reproducer slide will also occupy a midway position. Under these conditions the major slide will coact with the wing projection 178 and under the influence of the spring 167 will be forced forwardly farther than the position it normally occupies when resting against the low point 181 of the state control lever. In this position of the slides both of the weight levers will be moved to lift their styli from the record-cylinder; and in both right and left positions of the state control lever the friction upon the feed-nut will be released to render the carriage operatively free of the feed-screw. Attention is called to Figs 11A and 19 for a clear understanding of the disposition of the said cam wings. In Fig. 11A the state control lever is shown in rear elevation so that the cam wings occupy a reverse right and lefthand position as compared with the front view positions thereof shown in other figures, such as Fig. 1.

Referring to Fig. 18, attention is called to the fact that the abutment stud 115 hereinbefore mentioned in connection with the safety slide 104 is positioned to pass within a slot 182 in the carriage frame and also to be cleared by the cut-out portion 183 formed in the side of the major slide 163. The forward wall of the said notch 183 is provided with a bevel, indicated by 184. In the normal operation of the machine, as the carriage feeds forward the safety slide is telescoped thereby until the abutment 125 of the safety slide engages the advancing wall of the carriage. at which time the stud 115 will have passed within the notch 183 of the major slide, the major slide being in its normal forward position. Now. if the state control lever is pinched to the left for the purpose of backspacing, thus forcing the major and recorder minor slides rearwardly, the bevel wall 184 will act as a cam upon the stud 115 to advance the safety slide a predetermined distance ahead of the position occupied at that time by the carriage. At the end of this movement of the safety slide the recorder minor slide 164 will have traveled rearwardly until a notch 185 formed in the forward lower corner thereof comes over the recess 105 formed in the farthest-advance or safety slide. This positioning of the parts permits the lug 111 of the pawl lever 106 to rise above the upper surface of the slide 104, so that the point 108 of the pawl lever will engage the rack 109 and lock the safety slide 104 against further movement in the direction of forward travel of the carriage. It will also be held with considerable resistance against movement in the opposite direction, that is, toward the left end of the machine, unless the pawl is lifted from contact with the rack by manipulating the hand lever 113. The safety slide is advanced this predetermined distance. when the machine is conditioned for backspacing in order that after backspacing has been completed and the machine is conditioned to reproduce, the carriage while reproducing may travel to the right a short distance farther than it had traveled during recording, that distance being determined by the locked advance position occupied by the farthest-advance or safety slide. This insures that the reproducer stylus, which is mounted to make contact with the record at a point a slight distance to the left of the recording stylus, will travel completely to the end of the record groove made by the recording stylus, and that when the carriage abuts against the safety slide at the end of the carriage reproducing travel and the recording stylus is returned to the record for further recording, the latter will fall upon the record at a point slightly in advance of the point it last occupied, thus providing a clear or safety zone between the old record groove and the new one.

To hold the parts in position for free movement of the carriage a detent lever 119 is pivotally mounted in a recess 187 in a carriage boss 188, Fig. 41. The horizontal arm 186 of this lever is normally elevated by means of a spring 189 to force the detent point 190 toward the transverse center line of the carriage, in which position it is adapted under certain conditions to engage a notch 191 formed in the lefthand side of the reproducer slide 165 and thus hold the slide in a forward position against the tension of the spring 167. The reason for this detention will be explained later. The wall of the major slide 163 is cut away as at 192, see Fig. 19, to admit of the passage of the detent point 190 into engagement with the notch of the reproducer slide.

The operation of the dictating machine under varying conditions of use will now be described in so far as such description covers those parts of the machine already described, and first it is to be understood that the styli and the carriage feed-nut may be conditioned manually for recording, backspacing and reproducing, or that such conditioning may be automatically attained merely by actuation of the start-and-stop and reverse control of the driving and feeding mechanism hereinbefore described.

When the operator desires to record dictation he merely actuates a remote control for the start-and-stop solenoid which has been mentioned above, and then ensues rotation of the mandrel and rotation of the feed-screw in a direction to feed the carriage forwardly from its initial position at the head end of the machine. This is accomplished by actuation of the start-and-stop lever 80 which moves the mandrel shaft collar into operative engagement with the mandrel shaft worm wheel, and at the same time the clutch collar upon the feed-screw is moved into engagement with the driving gear 72. No attention has to be paid to the condition of the state control lever for it will automatically occupy its central position and the slide assembly will normally be conditioned as in Figs. 17 to 20 inclusive, with the major and recorder minor slides occupying their forward positions and the reproducer slide occupying its rearward position. In these positions the recorder stylus will be in engagement with the record while the reproducer stylus will be raised therefrom. Thus, recording may be carried on as long as the operator desires or until he again actuates the start-and-stop control to cause cessation of mandrel and feed-screw rotation. It should be noted here that the operation of the remote control for starting and stopping the machine also closes or opens the switch in a speaking circuit hereinafter to be described. It will be understood, of course, that starting and stopping need not be controlled remotely but may be performed through movement of the finger lever 24.

Should the operator, after having recorded a certain amount of dictation, desire manually to move the carriage back with reference to the dictated matter so as to listen in on what he has already said, he will first release the start-and-stop mechanism so as to bring the rotating parts to rest, and thereafter will reach down to the machine and press the state control lever 159 toward the lefthand finger-piece 161. The carriage parts will now assume the positions shown in Figs. 26 to 29 inclusive, with the friction on the feed-nut released to permit free rotation thereof with respect to the carriage. The recorder major and minor slides 163 and 164 are moved rearwardly by the camming action of the state control lever wing 176. During this movement the reproducer slide 165 will move forwardly, permitting the reproducer weight lever to swing about its pivot and bring the reproducer stylus into engagement with the record. This last is true only in case the form of major slide shown in Fig. 36 is employed, for if the form shown in Fig. 29 is employed the reproducer weight lever will not move far enough for the reproducer stylus to engage the record, but will be held in an intermediate position by means of the notch 175a. In either case, whether the stylus is on the record or not, it is prevented from moving laterally during the backspacing movement.

Up to this time the detent 190 has been kept out of engagement with the notch 191 in the reproducer slide by means of the finger 118 carried by the farthest-advance slide 104, for this finger abuts against the lower end of the detent lever 119 and prevents engagement of the detent. This is clearly shown in Fig. 41. Also, the position of the finger 118 may be determined by reference to Fig. 27. As soon, however, as the advance slide 104 has been moved to the right by the camming surface 184 of the major slide 163 when the parts are changed from recording to backspacing position a sufficient distance to enable the detent lever 119 to clear the finger 118 on the safety slide, the detent point 190 will enter the notch 191 in the reproducer slide and thereafter prevent relative movement of the slides, that is, they will be held in reproducing position even after the state control lever has been permitted to return to its central position.

Thus, it will be seen that in backspacing by hand, the operator pinches the state control lever to the left, slides the carriage to the left, releases the state control lever, when immediately the machine is conditioned for reproducing, for upon return of the state control lever to central position, although the reproducer slide is held in its forward position, the major slide under the force exerted upon it by the spring 187 moves forwardly until its projection 188 again lies at the low point 181 of the state control camming device. Thus the reproducer weight lever is entirely free from restriction and the reproducing stylus not only comes into operative contact with the record but has the freedom of lateral movement necessary properly to track the record.

As stated above, simultaneously with the pinching of the state control lever to the left to condition the slides for backspacing and prepare them for reproducing, the bevel wall 184 of the major slide, during the rearward moving of that slide, cams the stud 115 and slide 104 the distance to the right predetermined as necessary to provide a safety zone and, as also described above, the pawl lever on the safety slide is cleared by the recorder minor slide to permit the said pawl coming into engagement with the rack to lock the safety slide 104 in its advance position. In Fig. 28 the recorder weight lever is shown in its inoperative position with respect to the record-cylinder, and in Fig. 27 the reproducer weight lever is shown in operative position, in solid lines, and in inoperative position, in dotted lines. Whether the reproducer weight lever occupies the operative position or the inoperative position during back-spacing depends upon the type of major slide employed.

Turning to Figs. 30, 31 and 32, which show the machine conditioned for reproducing, the operation under these conditions is as follows: When the operator has backspaced the carriage the desired extent and has released the state control lever, which again assumes its central position as shown in Fig. 30, friction is again applied to the feed-nut which is prevented from rotating about its axis and becomes operative to feed the carriage when the feed-screw is rotated. The major slide will have returned to its forward position with its cooperating part in engagement with the low point of the camming device under influence of the spring interposed between it and the reproducer minor slide, but, as stated above, the reproducer minor slide will remain locked in its forward position. As the major slide moves forward the reproducer weight lever will move down into operative relation with the record-cylinder if the major slide is of the type shown in Fig. 29, or being already in engagement with the record-cylinder will be released for lateral movement, if the major slide is of the type shown in Fig. 36. The reproducer minor slide will remain locked in its forward position with the reproducing stylus operative and the recorder minor slide will remain in its rearward position with the recording stylus inoperative. The farthest-advance or safety slide will of course be in an outer position, that is, it will be in the position in which it was locked. In fact, the carriage may entirely uncover the farthest-advance slide. This condition is indicated in Figs. 6 and 7. Thus it will be seen that by merely pinching the state control lever in a lefthand direction the operator automatically moves the recording stylus into a locked-inoperative position; moves the reproducing stylus into a semi-operative position; moves the farthest-advance or safety slide a predetermined distance ahead for a safety zone; releases the friction on the circular feed-nut, and is enabled freely to move the carriage back manually any desired extent. Upon releasing the state control lever, at the end of backspacing he leaves the reproducer minor slide in a locked forward position; leaves the reproducing stylus in a fully operative position, maintains the recording stylus in a locked inoperative condition and again renders the circular feed-nut friction means operative.

When, however, the carriage has finished reproducing the matter previously recorded, or has been moved to the point where it again comes in contact with the farthest-advance slide, then the abutment finger 118 upon the farthest-advance slide engaging the detent lever 119 moves the latter to release the reproducer minor slide, which now under spring tension moves rearwardly to lift the reproducing stylus from the record and at the same time through the rocker-bar moves the recorder slide forwardly, permitting the recording stylus again to become operative. But during this forward movement of the recorder slide the edge of the notch 185 comes in contact with the upward projection 111 of the safety slide locking pawl and, moving the pawl against the tension of the spring 110, releases it from the rack and the farthest-advance slide is again free to move forwardly with the advancing carriage.

Having described the machine with reference to manual backspacing and manual control of the styli by means of the state control lever, the preferred manner of operation will now be described. It will be readily understood that while dictating it is desirable that the operator's attention may be directed solely to the subject matter of his discourse and that the free run of his thoughts should not be disturbed by having to pay attention also to the mechanical operation of the dictation recording machine. To this end the functioning of the machine for purposes of recording, backspacing and reproducing should be essentially automatic.

As in other dictating machines, a hand receiving and transmitting unit is provided which, as regards its novel features, will be fully described hereinafter. This hand unit, used both for receiving and transmitting, serves also as a convenient mounting for the remote control elements employed for starting, stopping and reversing, and the present machine is so constructed and arranged that by merely actuating one or the other of the remote controls mounted upon the hand unit, the machine may be fully controlled for recording, backspacing and reproducing. Thus, when the start-and-stop control is actuated the machine is set in operation, with the recording stylus in operative position upon the record, as hereinbefore described. If, however, after reaching a certain point in his dictation, the operator desires to backspace and listen in upon what he has said, he merely releases the start-and-stop control and actuates the backspace control upon the hand unit. When this occurs the backspace solenoid hereinbefore mentioned is energized to shift the reverse clutch lever 81 to the position shown in Fig. 6, which movement of the clutch lever 81 engages the feed-screw clutch collar with the small feed-screw worm wheel, resulting in high speed reverse rotation of the feed-screw. This will immediately cause the carriage to feed backwardly toward the beginning of the record.

In order, however, that the styli be properly conditioned and the farthest-advance slide 104 be moved to its advance position, the slide assembly mounted upon the carriage must be made to function in exactly the same manner as if the operator had moved the state control lever 159 to its lefthand position. This is accomplished by means of the slide plate 124, hereinbefore referred to as being seated within the recess 123 of the carriage bar. This plate extends beyond the left end of the carriage to a point within the housing 27 where it connects with the plate 87, previously spoken of as an interponent between the bifurcated end 86 of the reverse lever 81 and the clutch collar 69 upon the feed-screw shaft. When the lever 81 is shifted to reverse the feed-screw, the slide plate 124 is moved to the right in the carriage bar recess 123. By reference to Fig. 7 it will be seen that at its right end this slide plate 124 is formed with a beveled surface 195 which engages a pin 196 disposed transversely of the recess 123 in the path of travel of the said slide plate. Also, an inclined notch 197 near the lefthand end of the slide plate 124 coacts with a crosspin 198 in the same way.

When the lever 81 occupies its inoperative position with its rear end resting against the housing abutment 84, this slide plate is drawn to the left and its upper edge lies flush with the upper surface of the carriage bar, the position it occupies during recording or during hand control of the carriage as shown in Figs. 18, 20, 27, 28, 31 and 32. During automatic back-spacing it occupies the raised righthand position shown in Figs. 7, 34 and 35. As the slide plate lifts out of its recess 123, its upper rear edge engages the inclined surfaces 199 which constitute the rear walls of notches 183 formed in the side walls of the major slide 163. This engagement with the surfaces 199 forces the major slide rearwardly of the carriage in exactly the same way as would the camming surface of the state control lever. Simultaneously with this movement of the major slide the recorder minor slide 164 is moved to the position shown in Fig. 33, also by engagement of the upper edge of the rising slide plate 124 with the bevel surface 200, forming the rear edge of a notch 201 formed in the side of slide 164.

The reproducer minor slide 165 has a notch formed therein for the passage of this slide plate but this notch is rectangular and of such size as to provide clearance for the slide plate in all positions of the reproducer minor slide. This notch in the reproducer slide is indicated by the reference numeral 202 in Fig. 38, and may be seen in other views of the drawings. The two slides 163 and 164 are moved rearwardly, raising the recording stylus from the record. All of the other movements of the parts then follow in exactly the same way as they did during hand backspacing. The rocker-bar 171 moves the reproducer minor slide forwardly and prepares the reproducing stylus for operation. The safety slide 104 is moved to its advance position to provide a safety zone and is locked in that position by its locking pawl. During this movement of the safety slide, the lever 186 is released by the finger 118 to permit engagement of the detent point 190 with the notch in the slide 165, locking the latter in its forward position. The carriage is now moved to the left under the impulse of the reversed feed-screw. The stylus 134 is now prepared to reproduce when, at the end of the desired period of backspacing, the backspace control upon the hand unit is released and the start-and-stop control is again manipulated to operate the machine for the reproduction of the previously recorded matter. As before, at the end of the reproducing travel, when the carriage picks up the safety slide 104, the latter is released to travel with the carriage and the stylus control slides are automatically reshifted to recording position, so that the recording stylus again engages the record-cylinder at a point slightly in advance of the end of the previously formed record groove.

This automatic functioning of the machine for backspacing and reproducing will be clearly understood by a study of Figs. 33, 34 and 35, and it will be seen by comparing these figures with Figs. 30, 31 and 32 that the parts all occupy exactly the same positions, except that in Figs. 33, 34 and 35 the slide plate 124 is shown in its elevated position and the major slide is shown in the rearward position that it would occupy during backspacing, while in Figs. 30, 31 and 32 the slide plate 124 is shown in its lowered position and the slide 163 in the forward position it would occupy during reproducing. To sum up, it will be seen that when the remote backspace control is actuated the slide plate 124 shifts the major slide and minor slides to move the farthest-advance or safety slide ahead of the carriage a predetermined extent; to move the recording stylus into a locked inoperative condition; to move the reproducing stylus into a semi-operative or prepared condition; to move the feed-screw clutch collar out of operative engagement with the forward feed driving gear train, and to move it into operative engagement with the reverse feed worm wheel, thus effecting a very rapid automatic return of the sound-box carriage for so long as the backspace control is held by the operator.

It will be understood in this connection that the auxiliary manual control actuated by the finger lever 24 effects a similar set of operations and conditions of the various parts of the mechanism and effectuates an automatic return or backspacing of the carriage. The principal advantage of this auxiliary control is that it provides a positive control of the automatic backspacing mechanism in the event that accident renders the electric control mechanism inoperative.

The unique results attained in the automatic operation of the present machine are highly advantageous as compared with the operation of dictation machines heretofore known to the art, in that without any effort or attention upon the part of the operator, the machine is fully conditioned for reproducing at the end of the backspacing movement; and is again reconditioned and correctly positioned for receiving and recording dictation when the reproducing stylus reaches the end of the sound groove previously traced upon the record. Prior to my present invention it has been considered impracticable to attain power backspacing of a combined recording and reproducing machine, and it has not been possible, with any previously known machine, to condition the machine for recording, backspacing or reproducing, by simply manipulating the control means for the drive and feed mechanism. In all such previously known machines of this character, it is necessary first to properly condition the styli by manipulating the control lever stationed upon the carriage, and then to backspace either by manual operation of some device mounted upon the machine itself, or to slide the carriage by hand along its support. Then, the styli must be moved into their reproducing position by actuation of the hand control upon the carriage, and toward the end of the reproducing travel of the carriage the operator must give careful attention to his machine in order that he does not overrun the point where dictation ends. At the end of reproducing he must again reach down to the stylus control upon the carriage to recondition the recording stylus for recording dictation.

So far no mention has been made of the novel features contributing to the safe and ready loading and unloading of the machine, which involves placing a record-cylinder upon the mandrel and the removal thereof when the record is completed or a new cylinder is needed; but before describing these operations a description of the ejecting mechanism will be given. Reference has been made to the record-ejector operating lever 23, which is pivotally mounted at 205 upon the bracket supporting the carriage bar 20. This lever is connected with the ejector link 122, hereinbefore described as being slidably mounted in a guideway 121 formed in the rear wall of the carriage bar, see Figs. 5, 16 and 18. The connection between these two members consists of a slot 206 formed in the ejector lever 23, in which is seated a pin 207 extending transversely of the link 122 adjacent the right end thereof. The left end of the link is provided with a rearwardly extending offset 208, which projects to a point behind (to the left of) a portion of an ejector shoe 209. In its retracted or inoperative position this ejector shoe lies slightly to the left of the mandrel flange and, therefore, out of engagement with the record-cylinder when one is seated upon the mandrel. The ejector shoe is carried at the outer (right) end of a plunger 210, which extends within the housing 27 and is slidable in said housing.

Within the housing is mounted a slidable bolt 211, see Fig. 16, which is normally held, by means of a spring 213, the tension of which may be adjusted with a plug 214, in engagement with a notch 212 formed in the underside of the ejector plunger. The end of this bolt has a beveled engagement surface which functions, not only to hold the ejector plunger in its retracted or inoperative position, but also serves as a cam rapidly to complete the movement of the plunger to its inner or unoperated position, when upon its return from its operated position it reaches a predetermined point. When that point has been reached the end of the bolt starts to enter the notch 212 and thereafter quickly and fully seats itself, snapping the ejector plunger to its innermost position.

The reason for this arrangement will be clearly understood when it is explained that the ejector link 122 merely lies behind (to the left of) the ejector shoe and consequently can operate it in one direction only, that is, in its movement to eject a record from the cylinder. When the lever 23 has been moved to the dotted position shown in Fig. 16 the record-ejector shoe 209 will occupy the position indicated in Fig. 15, and the record will have been removed a distance from the mandrel flange. After the record has been brought to this point by the ejector, the operator removes it with his hand and need no longer hold the lever 23, but may release the latter to be returned to its rearward position by a spring 215, the ejector shoe with its associated parts remaining in the position shown in Fig. 15, until a new record-cylinder is placed upon the mandrel.

As the operator places a new cylinder upon the mandrel, the engagement of the inner end thereof with the ejector shoe, during the continued movement of the cylinder toward its seat, forces the ejector shoe and plunger back to its initial or unoperated position. It is obvious that the shoe cannot be carried far enough by the record-cylinder to reach its innermost position, so the restraining bolt 211 is employed to snap it home, in the above described manner.

The reason why it is desirable to maintain the ejector plunger in its outward position is that, secured to a portion of the ejector shoe, is a stabber rod 216 slidable in a guideway 217 formed in wall of the housing 27. At its forward end the stabber tapers downwardly to a point as indicated at 218, Fig. 16. The beveled surface 218 is designed to cooperate with a pin 219 extending rearwardly from the back of the recorder weight lever 135, see Figs. 13 to 15 and Fig. 18. Means, presently to be described, is provided for preventing the operation of the ejector except when the carriage has been returned to its initial position, that occupied in Fig. 14.

Now, as has hereinbefore been explained, the carriage parts are normally biased so that the recording stylus is in operative position relative to a record-cylinder, and as will appear presently, this condition exists when the carriage has been moved back by hand to its initial position. It is undesirable that a record should be put on or removed from the mandrel while the recording stylus is in a position to be engaged thereby, for, that way, the delicate recording stylus or its supporting parts are liable to be damaged, and the surface of the record-cylinder is apt to be marred. The office of the stabber rod 216 is to engage the pin 219 when the record-ejector is moved into contact with the inner end of a record and to raise the pin 219 to produce a swinging movement of the stylus carrier 135, which will lift the stylus clear of the record. In Fig. 14 the tapered end of the stabber will be seen just slightly to the left of the pin 219 so that a slight movement of the stabber to the right will lift the stylus. As seen in Fig. 15 the pin 219 has been raised by the stabber during the movement of the ejector to the position shown.

The means for preventing operation of the ejector, except when the carriage occupies its initial position, is a locking member 220, shown in Figs. 13, 14 and 15, and more clearly as to detail in Figs. 40, 41 and 42. This member consists of a latch portion 221 adapted to lie in front of a semi-cylindrical or slabbed pin 222 which projects upwardly from the ejector link 122 near the extreme left end thereof. Member 220 lies in a transverse channel 223 formed in the carriage bar and has a slot 224 formed therein, through which projects a pin 225 anchored in the carriage support. A spring 226 is secured to this pin and to an upturned flange 227 formed upon the locking member 220. The spring tends normally to hold the member 220 in the position shown in Fig. 42, where its end 221 lies in the path of the pin 222 and prevents actuation of the ejector mechanism. It is to be noted that the upstanding flange 227 is provided with a beveled surface 228 adapted to be engaged by the above described beveled surface 120 of the farthest-advance slide 104, when the said farthest-advance slide is returned with the carriage to the starting position. In Fig. 13 the carriage is represented as being returned toward its initial position, but has not progressed far enough for the surface 120 to engage the surface 228 of the ejector lock. In Fig. 14 the carriage has returned to its initial position, the coacting surfaces of the safety slide and the ejector lock have engaged to retract the ejector lock and clear the path of the pin 222 so that the operator may manipulate the record-ejector to remove a record-cylinder from the mandrel.

Assume that the operator has filled the surface of a record-cylinder with recorded matter and desires to substitute a new cylinder. His aim now is to return the carriage and the safety slide 104 together to their initial or starting position. The accomplishment of this is best explained in connection with Figs. 37, 38 and 39, which show the state control lever 159 in the position it will occupy when pinched to the right by the operator. This movement of the state control lever accomplishes several things. The camming wing 177 of the control lever coacts with the projection 179 upon the recorder minor slide 164 to move the recorder slide rearwardly to a central position and at the same time, through the rocker-bar 171, to move the reproducer slide 165 forwardly to a corresponding central position. In these positions the two minor slides maintain both styli out of contact with the record surface, so that the carriage may be moved without damage to either styli or to the surface of the cylinder. Also, the wing 178 of the state control lever permits the major slide 163 to be moved by the spring 167 to a position a little farther toward the front of the machine than it occupies when its projection 180 is in contact with the low point 181 of the state control camming device. This results in moving an abutment 299, see Fig. 38, formed upon the side of the slide 163 to a position where, upon movement of the carriage in a lefthand direction, it will engage the abutment finger 118 on the safety slide 104.

The safety slide is free to move with the carriage because the limited rearward movement imparted to the slide 164 is insufficient to bring the notch 185 to the position where it permits the locking pawl 106 to engage the rack 109. The operator may now, while still gripping the state control lever 159 and the finger hold 162, move the carriage to the extreme left end of the carriage bar, and the carriage will take with it the safety slide 104, and, as stated above, when the safety slide reaches the head end of the machine, the bevel 120 on the safety slide engages the corresponding bevel 228 on the ejector lock 220 to retract the lock and release the ejector for operation. Upon release of the control lever 159, the carriage slide parts will return to their normal recording position shown in Fig. 19, and the recording stylus will again assume its operative position.

The operator is now free to remove the record and does so by manipulating the record-ejector in the manner above described, when, as pointed out, stabber 218 comes into lifting contact with the pin 219 upon the recorder weight lever 135 and removes the recording stylus from contact with the record-cylinder at about the time the ejector shoe 209 engages the inner end thereof. The record-ejector continuing its outward movement loosens and moves the record so that it may easily be removed by hand. The record-ejector stays in its "out" position until the operator desires to put a new record upon the machine, for it is frictionally held in that position by the engagement of the bolt 211 against its undersurface. When pressure is brought to bear upon the ejector shoe by the advancing end of a new record, the slight pressure necessary to seat the record overcomes the frictional resistance of the bolt 211 and the record-ejector is carried backwardly with the record until such time as it is snapped clear of the record by the rapid seating of the bolt 211 within its seat 212. With this movement of the record-ejector the stabber is moved to an inoperative position with respect to the pin on the recorder weight arm, allowing the recording stylus automatically to assume its operative engagement with the record-cylinder. Thus it will be seen the machine is automatically conditioned for recording when the new record-cylinder is fully seated upon the mandrel.

Should the operator move the carriage to the left end of the machine by pinching the control lever to the left as he does when back-spacing preparatory to reproducing a part of the record.

he would be unable to operate the record-ejector because the safety slide would have been left behind in a locked position away from the head end of the machine. Under these conditions, if he wishes to remove the cylinder he may move the safety slide to its starting position by pressing the hand lever 113 to the left. This releases the pawl 108 from engagement with the rack and serves as a handle to move the safety slide. When the safety slide has been moved in this way to its starting position, it will effect a release of the ejector locking mechanism in the manner described, after which the record-ejector may be operated and the record-cylinder removed.

Reference was made in the beginning of this description to a combined electric recorder and reproducer unit indicated generally in Fig. 1 by the reference numeral 22. Referring to Figs. 21, 22 and 23, this unit, which I prefer to call a vibration translation device, will be seen to embody in its construction the general principles of other electro-magnetic vibration instruments, involving, however, a number of novel and important features. The unit is mounted upon the carriage frame in such a manner that adverse vibration and noises are absorbed before reaching the metallic parts of the mechanism, and for this purpose a rubber plate 230 is fastened to the bottom of the permanent magnet 231 by means of screws 232 and this assembly is in turn fastened to the top of the carriage frame by three screws 233, which threadedly engage carriage bosses 234, 235 and 188. These bosses may best be seen in the perspective view of the carriage shown in Fig. 11. It should be noted thus that the translation device is supported upon the rubber plate which serves as a damping means for the entire mechanism, and to enhance this effect the supporting bosses 234, 235 and 188 are so disposed that at no point do they underly the field magnet 231.

The magnet core 231 is formed substantially U-shaped, with the central portion 236 raised above and offset from the plane of the legs 239 and 240 which extend rearwardly toward the back of the unit. Upon this offset portion 236 there is mounted a magnet coil 237 which is connected in the speaking circuit in a manner to be described hereinafter. The magnet is provided with an armature 130 pivoted by means of a pin 238 to one polepiece 239 of the magnet and extending horizontally across the space between them to a point adjacent the end of the other polepiece 240 of the magnet. The armature 130 is provided adjacent the polepiece 240 with a comparatively stiff flat spring 241 secured to the armature by means of a screw 242. Two plates 243 and 244 of substantially L-shaped construction are secured adjustably along the side of the polepiece 240 by means of a screw 245. A portion of each of these members is positioned in spaced relation to the spring 241, one upon one side and one upon the other side thereof, as shown in Fig. 21, and serves to support between itself and the spring 241 a short section of rubber tubing or other resilient material suitable for damping vibrations of the armature. As the two plates are adjustably mounted they may be adjusted toward or away from the resilient member 241 in order to determine the air gap existing between the armature and the polepiece 240.

This arrangement enables the recorder and reproducer to operate either with strong or weak voice currents, and, also, this adjustment makes controllable the degree of compression under which the rubber tubing is placed so as to determine the degree of damping. If the machine is to be used by a dictator having a weak, or nonresonant voice, the gap will be made as small as possible, while on the other hand, if the voice of the dictator is strong, the gap will be increased. And, further, it should be understood, that by increasing the compression upon the rubber tubes, the recording will be high pitched, while by decreasing the compression low pitched recording may be had. The disposition of the armature with respect to the stylus weight levers is clearly shown in these figures. The stylus carriers 131 and 132 are connected to the armature by suitable means 246 and 247 in such a way as to enable the recording stylus, when it is in contact with the record-cylinder, to respond to vibrations caused by voice currents acting upon the magnet and produce a mechanical record upon the record-cylinder of the sounds which have produced those currents. When the recorder weight level is thrown back by the recorder minor slide so as to raise the recording stylus from the record, the carrier 131 swings around its pivot and changes its position so that it is possible to employ fixed lengths of wire to connect the said carrier with the armature. This also applies to the reproducing stylus which is adapted to track a record groove, transmit the vibrations therefrom through the wire 247 to the armature, producing vibration of the armature and changes in the reluctance of the magnetic circuit of the magnet. These changes in reluctance produce corresponding current changes in the speaking circuit to produce sound vibrations at the hand unit corresponding to the sound vibrations originally recorded. A casing or cover 248 extends over the entire recording and reproducing unit and is secured to the sides of the carriage block by means of screws 340.

The unit just described in connection with Figs. 21, 22 and 23 does not include in its assembly the stylus weight levers 135 and 136, for these, as has been explained above, are mounted between centers 139 and 140, which are supported within bosses 137 and 138 of the carriage block or frame. Figs. 21A, 22A and 24 and 25 show a modified construction in which the weight levers 135 and 136 are mounted upon centers which are carried by a bracket member 249 comprising a plate portion 250 extending across the magnet pole pieces and secured thereto by means of screws 251 and 252, and two forwardly and downwardly extending bracket arms 253 and 254 for supporting the adjustable centers 139 and 140. This construction, by removing the support of the stylus levers completely from the metallic body of the carriage and mounting those levers upon the magnet itself, which is resiliently supported by the carriage, provides an additional safeguard against the transmission of metallic and mechanical noises to the styli; and provides a self-contained recording and reproducing unit including weight arms and stylus carriers, readily attachable to and removable from the carriage.

In connection with the modified form just described there have been shown other important features, but it is to be understood that these features may be incorporated in the type of reproducer and recorder unit shown in Figs. 21 to 23. One of these features constitutes a device by means of which the rate at which the weight levers descend, when they are permitted to do so by the forward movement of their respective operating slides, may be controlled, and comprises a dashpot 255 mounted above the magnet, in this case as an integral part of the bracket member 250. This dashpot is fastened substantially above the reproducer minor slide 165. Mounted to reciprocate within the dashpot is a plunger 256 having a pin 257 extending transversely across its rear end. A lever 258 is pivotally mounted upon the bushing member 145 which surrounds the center 139, and at its upper end is slotted to embrace the pin 257, while at its lower end it is slotted to embrace a pin 259 extending horizontally from a portion of the left side wall of the reproducer minor slide. The position of this pin is clearly shown in Figs. 19, 22, 22A, 24 and 25.

The operation of this mechanism will be readily understood when it is remembered that the reproducer minor slide really actuates the stylus weight lever only during its movement toward the rear of the carriage, that is, when it raises the stylus from the record. When the reproducer slide moves toward the front of the carriage, the reproducer weight lever moves by gravity and unless its movement is retarded the stylus may descend upon the record-cylinder with such impact as to cause considerable shock to the sensitive stylus and to cause a sharp clicking noise annoying to the operator. Although the dashpot is connected directly with the reproducer minor slide it will be understood that it will have the same effect upon the recorder minor slide because the latter is connected to the reproducer slide through the rocker-bar. So in effect the dashpot retards the movement of the stylus weight levers in either direction, for in one case they retard their gravitational movement and in the other case they retard the action of the spring 167. The use of a dashpot is optional and has not been shown throughout the drawings although it is to be understood that it is an integral part of the invention. In omitting it from many of the views of the drawings the object has been to avoid complication and render the drawings more easily readable.

Provision is further made for controlling the damping of the armature so as to produce relatively heavy damping during the recording operation and relatively light damping during the reproducing operation. The ability to change the armature from a slightly damped condition for reproducing to a highly damped condition for recording and vice versa, is highly desirable because vibrations received from the reproducing stylus are less strong than the vibrations imparted to the armature by the voice currents during dictation. This device comprises a stud or pin 260, see Fig. 21 and Figs. 21A, 22A, 24 and 25, to which pin is pivotally mounted an auxiliary damping arm 261, the lower end of which is pivotally mounted by means of a pin-and-slot connection to the pin 259 of the reproducer slide, the same pin to which the dashpot lever is attached. Adjacent the upper end of the arm 261 there is supported a small block of felt or rubber 262 which may be so designed in thickness as to be adapted to move into contact with the magnet armature 130. With this arrangement of parts, when the reproducer slide is in its rearward position, that is, while the machine is conditioned for recording, the damping block 262 will be brought into relatively firm contact with the armature 130, while when the reproducer minor slide is moved forwardly of the carriage to bring the reproducing stylus into engagement with the record, then the damping block 262 will be partially or entirely removed from contact with the armature, so that the damping effect will be proportionately lightened or completely removed. As in the case of the dashpot, this feature is an auxiliary one and may or may not be used without in any way affecting the general operation of the recorder and reproducer unit.

By reference to Figs. 21 and 21A it will be seen that a flat surface is provided at the extreme top end of each of the stylus weight carriers, upon which flat surface appears an indication to enable the operator to determine which stylus is in operative relation to the record by merely glancing down at the machine. The indications shown upon these surfaces, indicated by the numerals 263 and 264, will only appear beyond the rear edge of the cover 246 when the respective weight carriers are in their rearward position and their respective styli are operatively engaging the record. This will be clear by reference to Fig. 24 wherein the indication on the surface 263 of the reproducer weight carrier is visible, while the surface 264 of the recorder weight lever is hidden from view.

Connected with the electric recorder and reproducer unit by suitable wiring, to be later described with reference to circuit diagrams, and which wiring is encased in the flexible cable 19, is the hand unit 18, see Figs. 43 to 46, comprising an outer casing or handle 265 of substantially triangular cross section, flaring at one end to provide a circular opening 266, and threaded upon this end is a mouthpiece 267. Mounted between the mouthpiece and the casing is a diaphragm 268 made of a suitable magnetic material; and also supported between the mouthpiece and the casing is a bracket member 269 composed of a nonmagnetic material. The mouthpiece is disposed at an angle to the handle portion of the unit to make the instrument easier to handle, and the casing is further provided with a shoulder 270 to aid the operator, when he lifts the instrument, to place his hand in such a position as to facilitate the operation of a start-and-stop control button 271 and a reverse or backspace control button 272.

The hand unit constitutes a combined telephone receiver and transmitter including in its construction a permanent magnet member 273 shaped in substantially U-form with elongated side members 274 and 275 reduced at their polar ends to provide the offset polepieces 346 and 347. These polepieces support magnet coils 348 and 349 and the entire magnet unit is mounted in proper relation to the diaphragm 268 by means of the bracket 269 mentioned above, which holds the magnet in rigid relation to the casing.

Mounted at 276 in the casing just forwardly of the shoulder 270 is a signal lamp, the function of which will be described hereinafter. Mounted between the legs of the magnet is a switch assembly, indicated generally by the number 277, and comprising an insulation block 278 and a plurality of contact springs numbered respectively 279, 280, 281, 282 and 283 mounted therein. At their forward ends springs 280 and 282 are mechanically joined together by insulation means 284. At their rear ends springs 280, 281, 282 and 283 are provided with extensions to which wires may be soldered or otherwise secured, and spring 279 is provided at its forward end with a wire connecting means. The principle of the telephone instrument as a receiver is well understood. It need only be mentioned here that when the dictator speaks into the mouthpiece, sound vibrations are translated into modulated electrical currents which are transmitted through a speaking circuit to the recorder, where electrical currents are translated into mechanical vibrations which are in turn recorded upon a record-cylinder by the recording stylus. When it is desired to reproduce, mechanical vibrations are taken from the record-cylinder, transformed into a modulated electric current in the speaking circuit, and again transformed into sound waves at the mouthpiece of the hand unit.

As shown in Fig. 44, the hand unit when not in use rests upon a cradle 17, also shown in Fig. 1. This cradle may be of any suitable construction and is provided with two downwardly extending pins 285 and 286 which slidably fit in guideways 287 and 288 provided for that purpose in the housing member 27. Pin 285 rests upon a spring 289, held under compression by the combined weight of the cradle and hand unit, but strong enough to raise the cradle when the hand unit is removed therefrom. The pin 286 carries at its lower end an insulating member 290 adapted to engage and spread the contact fingers 291 and 292 of an electric switch 293. This switch is connected in the power circuit of driving motor 28, as will be more fully described, and serves to put the machine in operation when the hand unit is removed from its cradle. When the hand unit is placed upon its cradle and combined weight overcomes the force of the spring 289 and the insulation member 290 descends between the contacts 291 and 292 to open circuit the motor 28.

A more specific description may now properly be given of the electromagnetic start-and-stop and reverse control device. As hereinbefore stated, this comprises a pair of solenoids 98 and 97. Referring to Figs. 12, 42 and 44, it will be seen that the solenoid 98 serves to operate the start-and-stop clutch lever 80 and the solenoid 97 serves to actuate the reverse clutch lever 81. The solenoid 97 is made of greater length than the solenoid 98, as it is necessary that the solenoid core or armature 99, which is actuated alternatively by either of them, have a greater throw when it is desired to operate the reverse mechanism than when the start-and-stop mechanism is to be controlled. This will be apparent by reference to Figs. 6 and 8, which shows that the distance the lever 80 moves away from its position of rest against the stop 84 is much less than the distance through which the lever 81 moves away from that stop. Figs. 42 and 44 show the circuit connections for all of the electrical features hereinbefore described. In Fig. 44 the motor is diagrammatically indicated at 28, the start-and-stop solenoid at 98, the reverse solenoid at 97, and the magnet of the reproducer and recording unit at 237.

A battery 294 is indicated as supplying direct current to the speaking circuit, which comprises a wire 295 leading to the magnet coil 237, a wire 296 leading from magnet coil 237, through an opening 297 in the hand unit, to the magnet coils 348 and 349. From these coils a wire 298 leads to switch spring 279. From the other side of battery 294 a wire 299 leads to contact or switch spring 280, which spring is provided with a contact stud 300 adapted to make contact with spring 279. This completes the speaking circuit. Current for the control solenoids 97 and 98 is derived from suitable brushes 28a and 28b of the motor 28 and the difference in potential between brushes 28a and 28b may be determined by the disposition of these brushes with reference to the main line brushes 28c and 28d of the motor. The circuits for the solenoids are as follows: From brush 28a a wire 301 leads to reverse solenoid 97, from which solenoid a wire 302 leads into the hand unit to switch spring 283 which is provided with a contact member 303 adapted to make contact with switch spring 282. From switch spring 282 a wire 304 leads back to the other brush 28b of the motor. From wire 301 a wire 305 leads to the start-and-stop solenoid 98 and from that solenoid a wire 306 leads to the interior of the hand unit and connects with leaf spring 281, with which spring a contact member 307 provided on leaf spring 282 is adapted to come into engagement. The circuit for the start-and-stop solenoid is completed through spring 282 and wire 304 to motor brush 28a.

The motor may be supplied with power from any desired source, preferably from a house lighting circuit, by means of connection plug and socket 35 shown in Fig. 2, from which connection a wire 308 leads to contact 291 of switch 293, and from contact 292 of switch 293 a wire 309 leads to motor brush 28d. The motor circuit is completed back to the plug connection 35 by means of a wire 310.

The signal lamp 276 is in a circuit connected by means of a wire 311 to one side of the speaking circuit, as to wire 298. The other side of the lamp socket is connected by a wire 312 to a switch member 313 of a switch 314 and also to a switch member 315 of a switch 316. Switch 314 has a coacting switch contact 317 and switch 316 has a coacting contact 318. These last two contacts are connected together and to a wire 319 which leads back to wire 295 of the battery circuit.

By reference to Fig. 42 it will be seen that the switch 314 is mounted upon the rear of the housing block 27. The movable switch contact 313 is, under certain conditions, brought into contact with the fixed switch member 317 by means of a fibre rod 320 slidably mounted in the housing 27, and in engagement at one end with contact 313 and at the other end adapted to fit within a notch 321 formed in the side of record-ejector plunger 210. This notch is so formed and disposed that the rod 320 rests therein when the ejector is in its idle or unoperated position. When the ejector is operated to remove a record from the mandrel, the rod is lifted out of the slot and moved endwise sufficiently to bring the contacts 313 and 317 together, closing the signal circuit. Under these conditions current from the battery will light the signal lamp 276, which will remain lighted so long as the speaking circuit is closed and the ejector plunger stands in its operated position. The signal lamp may also be lighted when the speaking circuit is closed and the carriage reaches the end of its forward travel toward the right end of the machine. This is accomplished by means of a contact member 322, see Fig. 42, mounted upon the carriage which, when the carriage reaches the end of its path of travel, is thrust between contacts 315 and 318 of switch 316 and closes the signal circuit.

Operation of the various electrical mechanisms will now be described in connection with their circuits. When it is desired to record dictation, a record having been placed upon the mandrel, the operator removes the hand unit from its cradle, which action closes the motor circuit and starts rotation of the driving motor. He may now press the button 271 to close the circuit through the start-and-stop solenoid by contact of the leaf springs 281 and 282. This starts mandrel rotation and rotation of the feed-screw in a direction to produce forward feed of the carriage. Simultaneously with the closure of the circuit through the start-and-stop solenoid the speaking circuit is closed by contact between the leaf springs 279 and 280. Now everything is prepared and operative for recording dictation. The dictator continues recording as long as he desires and then removing his finger from the button 271 breaks the speaking circuit and de-energizes the start-and-stop solenoid, when the spring 83 will return the start-and-stop lever 80 to its inoperative position. If at any time while recording he desires to backspace and listen in on what he has previously said, he removes his finger from the start-and-stop button 271 and presses the reverse button 272. This action closes the circuit through the reverse solenoid by bringing spring leaves 283 and 282 into contact. He may now continue backspacing to the point desired and then as hereinbefore described may operate his controls to discontinue the reverse rotation of the feed-screw and produce forward rotation of the feed-screw and rotation of the mandrel for reproducing. If while recording he fails to notice that the carriage is approaching the end of the record-cylinder, he will be automatically warned of that fact when the carriage progresses far enough for contact plug 322 to engage switch members 315 and 318 to produce a signal at the lamp 276 mounted upon the hand unit. As this signal occupies a position just before his eyes he can hardly fail to be warned that it is time to change records. Similarly, if he should desire to dictate and fails to place a new record on the machine after having ejected the old one, he will be warned of the condition of the machine as soon as he takes the hand unit from its cradle and operates the start-and-stop button 271, because the ejector plunger being out, switch contacts 313 and 317 will be closed, the speaking circuit will be closed and current will flow from the battery through the signal lamp, lighting the same and giving the desired warning. In Fig. 44 there is shown in dot and dash lines at 323 an alternative signal device which, as illustrated, is meant to indicate an electric buzzer. Such a buzzer may be mounted at any suitable point and connected with the speaking circuit or other source of current.

It should be particularly noted as one of the outstanding advantages of my invention that either a dictator's recording and reproducing machine or a transcriber's reproducing machine may be constructed in accordance therewith by the simple addition or omission of the recorder stylus and its associated operating parts. That is, a transcribing machine built in accordance therewith would be practically identically the same throughout as a recording machine.

From the foregoing, it will be seen that there is herein provided a machine which achieves the objects of this invention, including many practical advantages. The parts are compactly arranged for convenient accessibility, and the machine is convenient to operate and thoroughly practical throughout.

As many possible embodiments may be made of the above invention without departing from the scope thereof, it is to be understood that all matter herein set forth or shown in the accompanying drawings is to be interpreted as illustrative and not in a limiting sense.

I claim:

1. In a dictating machine having a carriage slidably mounted relatively to a rotatable mandrel, driving means, a feed-screw, means cooperating with said driving means to rotate said mandrel and to rotate said feed-screw to forward space said carriage at a relatively slow speed, and means acting independently of said mandrel-rotating means adapted to cooperate with said driving means to rotate said feed-screw at a relatively high speed in the reverse direction to provide a rapid backspacing movement of said carriage.

2. In a dictating machine having a carriage slidably mounted relatively to a rotatable mandrel, mandrel driving means, a feed-screw for imparting movement to said carriage, feed-screw actuating means for effecting forward carriage movement, feed-screw actuating means for effecting backspacing carriage movement, control means for rendering effective said mandrel drive and forward feed actuating means, control means for rendering effective said backspacing feed actuating means, and operating means for rendering effective either of said control means.

3. In a dictating machine, a structural unit comprising, in combination, a mandrel-shaft, a reversible feed-screw, a drive-shaft, transmission means adapted to coact with said drive-shaft simultaneously to drive said mandrel shaft and to cause rotation of said feed-screw in one direction, transmission means independent of said first transmission means adapted to coact with said drive-shaft to rotate said feed-screw in the opposite direction, and control means adapted selectively to control the operation of said transmission means.

4. In a dictating machine, in combination, a carriage slidably mounted relatively to a rotatable mandrel, driving means, a mandrel shaft, a feed-screw, start-and-stop mechanism adapted to establish a driving train comprising said driving means, mandrel shaft and feed-screw, backspace mechanism adapted to establish a direct driving connection between said driving means and said feed-screw, and selectively operable means for rendering said start-and-stop mechanism and said backspace mechanism alternatively effective.

5. In a dictating machine having a carriage slidably mounted relatively to a rotatable mandrel, a drive-shaft, a mandrel shaft, a feed-screw, start-and-stop mechanism coacting with said drive-shaft to cause mandrel rotation and rotation of said feed-screw, backspace mechanism coacting independently with said drive-shaft to cause reverse rotation of said feed-screw, and means selectively controlling the operation of said start-and-stop mechanism and said backspace mechanism.

6. In a dictating machine having a carriage slidably mounted relatively to a rotatable mandrel, driving means and a carriage feed-screw, in combination, alternatively operable means for establishing a forward or a reverse driving connection between said driving means and said feed-screw, control means for rendering one or the other of said alternatively operable means effective, and means for causing mandrel rotation whenever the said forward driving connection is established and said driving means is in operation.

7. In a dictating machine having a carriage slidably mounted relatively to a rotatable mandrel, driving means, and a carriage feed-screw, in combination, means for establishing a forward feed driving connection between said driving means and said feed-screw comprising means for rotating said mandrel, means independent of said means for rotating said mandrel for establishing a reverse feed driving connection between said driving means and said feed-screw, and control means for selectively rendering one or the other of said connection means effective.

8. In a dictating machine having a rotatable mandrel and a reversible feed-screw, in combination, a drive-shaft, start-and-stop mechanism for enabling said drive-shaft to rotate said mandrel and to rotate said feed-screw in one direction, a backspace device for interrupting the rotation of said mandrel and reversing the direction of rotation of said feed-screw, and an electromagnetic control device for selectively rendering said start-and-stop device or said backspace device effective.

9. In a dictating machine, in combination, a mandrel, a carriage movably mounted relatively to said mandrel, a single means operable selectively to impart forward or backspace motion to said carriage, forward space control mechanism, independent backspace control mechanism, electromagnetic means for rendering one or the other of said control mechanisms effective, and a remote control for said electromagnetic means.

10. In a dictating machine, in combination, an electrical recorder mounted for movement relative to a rotatable mandrel and adapted to make a record groove upon a cylinder supported by said mandrel, means for imparting operative movement to said recorder and mandrel for recording, a circuit containing an electrically operated start-and-stop control for said means, a circuit containing an electrically operated backspace control for said means, a speaking circuit containing a telephone instrument and said recorder, a switch unit mounted in said telephone instrument comprising circuit-closing means for each of said circuits, a single means for actuating the circuit-closing means in said start-and-stop and speaking circuits, and separate means for actuating the circuit-closing means in said backspace circuit.

11. In a dictating machine, in combination, a rotatable record-support, start-and-stop means for controlling the operation of said record-support, a record-ejector operable from an "in" to an "out" position to eject a record carried by said support, means for retaining said record-ejector in its "out" position, a signal device, and means for causing said signal device to give a warning if said start-and-stop means is actuated to cause rotation of said record-support with said record-ejector retained in its "out" position.

12. In a dictating machine, in combination, a rotatable record-support, start-and-stop means for controlling the operation of said support, a record-ejector operable from an "in" to an "out" position to eject a record carried by said support, means for retaining said record-ejector in its "out" position, an electrical signal device, a source of electric current, and means connecting said source of current to render said signal device effective if said start-and-stop means is actuated to cause rotation of said record-support with said record-ejector retained in its "out" position.

13. In a dictating machine, in combination, a carriage, a carriage lever having a recording position and a constrained backspace position, a recording stylus normally biased for recording and having another position during backspacing, a reproducing stylus normally held in an inoperative position and having another position during backspacing, means controlled by movement of said carriage lever from recording to backspace position for conditioning both styli for backspacing, and means operable when said carriage lever is released for conditioning said reproducing stylus for reproducing.

14. In a dictating machine, in combination, a carriage, a carriage lever having a released position and a constrained backspace position, a recording stylus normally biased for recording and having another position during backspacing, a reproducing stylus normally held in an inoperative position and having another position during backspacing, means controlled by movement of said carriage lever from released to backspace position for conditioning both styli for backspacing, means operable when said carriage lever is released for conditioning said reproducing stylus for reproducing, and feeding means operative to feed the carriage when the carriage lever is in released position, and inoperative to feed the carriage when said lever is moved to constrained backspace position.

15. In a dictating machine, in combination, a carriage bar, a carriage slidably mounted thereon, state-control means having a biased normal released position and a constrained backspace position, a recording stylus, a reproducing stylus, and means normally biased to condition said recording stylus in an operative position and said reproducing stylus in an inoperative position, said conditioning means being operable when said state-control means is moved from released position to constrained backspace position to bring said recording stylus to an inoperative position and said reproducing stylus to an operative position.

16. In a dictating machine, in combination, a carriage bar, a carriage slidably mounted thereon, state-control means having a normal released position and a constrained backspace position, a recording stylus, a reproducing stylus, means normally biased to condition said recording stylus in an operative position and said reproducing stylus in an inoperative position, said conditioning means being operable when said state-control means is moved from released position to constrained position to bring said recording stylus to an inoperative position and said reproducing stylus to an operative position, and means for retaining said reproducing stylus in its reproducing position after the release of said state-control means.

17. In a dictating machine, in combination, a carriage bar, a carriage slidably mounted thereon, state-control means having a normal released position and a constrained backspace position, a recording stylus, a reproducing stylus, means normally biased to condition said recording stylus in an operative position and said reproducing stylus in an inoperative position, said conditioning means being operable when said state-control means is moved from released position to constrained position to bring said recording stylus to an inoperative position and said reproducing stylus to an operative position, said reproducing stylus being mounted for limited lateral movement relatively to the carriage, and means operative to prevent lateral movement thereof while the state-control means is in its backspacing position, but permitting lateral movement of said reproducing stylus after the state-control means has been released from backspace position.

18. In a dictating machine, in combination, a rotatable record-support, a carriage guide-bar, a carriage slidably mounted thereon, recording and reproducing styli movable with said carriage longitudinally of said record-support, and movable relatively to said carriage and to each other into and out of contact with a record on said support, the reproducing stylus being mounted to have limited lateral movement to permit it to track the record, and stylus positioning means mounted for sliding movement relatively to said carriage.

19. In a dictating machine, in combination, a rotatable record-support, a carriage guide-bar, a carriage slidably mounted thereon, recording and reproducing styli movable with said carriage longitudinally of said record-support, and movable relatively to said carriage into and out of contact with a record on said support, the reproducing stylus being mounted to have limited lateral movement to permit it to track the record, stylus positioning means mounted for movement relatively to said carriage, means normally maintaining said positioning means in recording position, and state-control means mounted upon said carriage and movable from a resiliently biased position to a manually constrained position to shift said positioning means to reproducing position.

20. In a dictating machine, in combination, a rotatable record-support, a carriage guide-bar, a carriage slidably mounted thereon, recording and reproducing styli movable with said carriage longitudinally of said record-support, and movable relatively to said carriage into and out of contact with a record on said support, the reproducing stylus being mounted to have limited lateral movement to permit it to track the record, stylus positioning means mounted for movement relatively to said carriage, means normally maintaining said positioning means in recording position, state-control means mounted upon said carriage and movable from a resiliently biased position to a manually constrained backspace position to shift said positioning means to reproducing position, and means associated with said positioning means for preventing lateral movement of said reproducing stylus while backspacing but permitting lateral movement thereof for tracking the record upon release of said state-control means at the end of the backspacing movement.

21. In a dictating machine, in combination, a rotatable record-support, a carriage guide-bar, a carriage slidably mounted thereon, recording and reproducing styli movable with said carriage longitudinally of said record-support, and movable relatively to said carriage into and out of contact with a record on said support, a feed-screw rotatable in said carriage guide-bar, feed-screw engaging means on said carriage, a state-control lever adapted to be moved from a normal position to a constrained position with said reproducing stylus conditioned to be inoperative for rendering said feed-screw engaging means ineffective to move said carriage, and means responsive to said movement of the state-control means for automatically conditioning the reproducing stylus for operation when said state-control means is returned to its normal position.

22. In a dictating machine, in combination, a carriage, state-control means having a released position and a constrained backspace position, a recording stylus normally biased for recording, a reproducing stylus normally held in an inoperative position, means adapted when said state-control means is moved to backspace position to render said recording stylus inoperative and to so condition said reproducing stylus that upon the return of said state-control means to normal position said reproducing stylus will become operative.

23. In a dictating machine, in combination, a carriage, state-control means having a released position and a constrained backspace position, a recording stylus normally biased for recording, a reproducing stylus normally held in an inoperative position, a guide-bar for slidably supporting said carriage, a safety-slide mounted on said bar for movement with said carriage, and means for moving said slide to an advanced position relatively to said carriage and locking same against further movement relatively to said bar when said state-control means is moved to its constrained backspace position.

24. In a dictating machine, in combination, a carriage slidably mounted relatively to a record-support, rotating means for advancing said carriage and reversible for backspacing said carriage, mechanism having operative and inoperative positions for reversing rotation of said rotating means, a normally operative recording stylus and a normally inoperative reproducing stylus, both mounted on said carriage, and means on said carriage responsive to shifting of said reversing means to operative backspacing position for making said recording stylus inoperative and enabling said reproducing stylus to be effective upon return of said reversing mechanism to its inoperative position.

25. In a dictating machine, in combination, a carriage slidably mounted relatively to a record-support, rotating means for advancing said carriage and reversible for backspacing said carriage, mechanism having operative and inoperative positions for reversing rotation of said rotating means, a normally operative recording stylus having operative and inoperative positions, a normally inoperative reproducing stylus having inoperative, constrained and operative positions, both styli being movably mounted relatively to said carriage, means on said carriage responsive to shifting of said reversing mechanism to operative backspace position for moving said recording stylus to inoperative position and simultaneously moving said reproducing stylus to its constrained position, and means on said carriage enabling said reproducing stylus to assume its operative position when said reversing mechanism is returned to its inoperative position.

26. In a dictating machine, in combination, a carriage slidably mounted relatively to a rotatable record-support, rotating means for advancing said carriage and reversible for backspacing said carriage, mechanism having operative and inoperative positions for reversing rotation of said rotating means, a carriage support on which said carriage is slidably mounted, safety means adapted at times to limit the advance of said carriage and movable upon said support with said carriage during its advance movement, and means responsive to shifting of said reversing mechanism to operative backspace position, for causing limited advancement of said safety means beyond the position to which it has moved with said carriage.

27. In a dictating machine, in combination, a carriage slidably mounted relatively to a rotatable record-support, rotating means for advancing said carriage and reversible for backspacing said carriage, mechanism having operative and inoperative positions for reversing rotation of said rotating means, a carriage support on which said carriage is slidably mounted, safety means adapted at times to limit the advance of said carriage and movable upon said support with said carriage during its advance movement, and means responsive to shifting of said reversing mechanism to operative backspace position, for causing limited advancement of said safety means beyond the position to which it has been moved by said carriage, means preventing movement of said safety means beyond this point of limited advance, and means for releasing said preventing means when, after return of said reverse mechanism to its inoperative position said carriage is moved to the advance position set by said safety means.

28. In a dictating machine, in combination, a carriage slidably mounted relatively to a rotatable record-support, rotating means for advancing said carriage and reversible for backspacing said carriage, mechanism having operative and inoperative positions for reversing rotation of said rotating means, a normally operative recording stylus and a normally inoperative reproducing stylus, both mounted on said carriage, means on said carriage responsive to shifting of said reversing means to operative backspace position for making said recording stylus inoperative and enabling said reproducing stylus to be effective upon return of said reversing mechanism to its inoperative position, a carriage support on which said carriage is slidably mounted, safety means adapted in the inoperative position of said recording stylus to limit the advance of said carriage and movable upon said support with said carriage during its advance movement, and means responsive to shifting of said reversing mechanism to operative position, for causing limited advancement of said safety means beyond the position to which it has been moved by said carriage.

29. In a dictating machine, in combination, a carriage slidably mounted relatively to a rotatable record-support, rotating means for advancing said carriage and reversible for backspacing said carriage, mechanism having operative and inoperative positions for reversing rotation of said rotating means, a normally operative recording stylus and a normally inoperative reproducing stylus, both mounted on said carriage, means on said carriage responsive to shifting of said reversing means to operative backspace position for making said recording stylus inoperative and enabling said reproducing stylus to be effective upon return of said mechanism to its inoperative position, means for starting advance rotation of said rotating means after said reverse mechanism becomes inoperative, and means actuated by the advance of said carriage beyond a predetermined point for reconditioning said recording stylus for recording.

30. In a dictating machine, in combination, a carriage slidably mounted relatively to a rotatable record-support, rotating means for advancing said carriage and reversible for backspacing said carriage, mechanism having operative and inoperative positions for reversing rotation of said rotating means, a normally operative recording stylus and a normally inoperative reproducing stylus, both mounted on said carriage, means on said carriage responsive to shifting of said reversing means to operative backspace position for making said recording stylus inoperative and enabling said reproducing stylus to be effective upon return of said mechanism to its inoperative position, a carriage support on which said carriage is slidably mounted, safety means movable upon said support with said carriage during its advance movement, means responsive to shifting of said reversing mechanism to operative position, for causing limited advancement of said safety means beyond the position to which it has moved with said carriage, means for starting advance rotation of said rotating means after said reverse mechanism becomes inoperative, and cooperating means on said carriage and said safety means operable when said carriage has advanced a predetermined distance to recondition said stylus for recording.

31. In a dictating machine, in combination, a recording stylus, means normally biasing said stylus in an operative position, a record-ejector, and means adapted to move said stylus to an inoperative position upon actuation of said record-ejector.

32. In a dictating machine, in combination, a record-ejector adapted to remain set either in an operated or an unoperated position, a recording stylus, means for making said stylus inoperative when the record-ejector occupies its operated position, and means for making said stylus operative when said record-ejector occupies its unoperated position.

33. In a dictating machine, in combination, a record-support, a recording stylus, means adapted to prepare said stylus for operation when a record-cylinder is placed upon said record-support, means adapted to rotate said record-support, means adapted to feed said stylus longitudinally of said support, and a start-and-stop device adapted to initiate both said movements to enable said stylus to trace a record groove upon said record-cylinder.

34. In a dictating machine, in combination, a carriage guide-bar, a carriage slidably mounted thereon, a slide mounted on said guide-bar adapted under certain conditions to limit the movement of said carriage along said guide bar and normally movable by and with said carriage from an initial position and normally not movable by said carriage back to initial position, state-control means on said carriage having an operating and a reloading position, and means on said carriage adapted when said state-control means is in reloading position to make said slide movable by and with said carriage back to initial position.

35. In a dictating machine, in combination, a carriage guide-bar, a carriage slidably mounted thereon, a slide mounted on said guide-bar adapted under certain conditions to limit movement of said carriage along said guide bar and normally movable by and with said carriage from an initial position and normally not movable by said carriage back to initial position, state-control means on said carriage having a normal operating and a reloading position, means on said carriage adapted when said state-control means is in reloading position to make said slide movable by and with said carriage back to initial position, a stylus-carrier mounted on said carriage and normally biased in an operative position, and means for moving said stylus-carrier to an inoperative position when said state-control means is shifted to reloading position.

36. In a dictating machine, in combination, a carriage guide-bar, a carriage slidably mounted thereon, a slide mounted on said guide-bar movable by and with said carriage from an initial position and normally not movable by said carriage back to initial position, state-control means on said carriage having an operating and a reloading position, means on said carriage adapted when said state-control means is in reloading position to make said slide movable by and with said carriage back to initial position, a record-ejector and operating means therefor, and locking means effective to prevent actuation of said record-ejector except when said slide is in its initial position.

37. In a dictating machine, in combination, a carriage guide-bar, a carriage slidably mounted thereon, a slide mounted on said guide-bar movable by and with said carriage from an initial position and normally not movable by said carriage back to initial position, state-control means on said carriage having a normal operating and a reloading position, means on said carriage adapted when said state-control means is in reloading position to make said slide movable by and with said carriage back to initial position, a record-ejector and operating means therefor, locking means effective to prevent actuation of said record-ejector except when said slide is in its initial position, and means tending to hold said record-ejector in its operated position until displaced therefrom by a record when the latter is forced to its seat upon the record-support.

38. In a dictating machine, in combination, a record-support, a carriage guide-bar, a record-ejector movable relatively to said record-support, an ejector-lock, a slide mounted for movement along said carriage guide-bar, a carriage slidable on said bar with which said slide is movable away from an initial position, means on said slide for making said lock ineffective when the slide is in its initial position, and means preventing movement of said slide to initial position when the carriage is out of initial position.

39. In a dictating machine, in combination, a record-support, a carriage guide-bar, a record-ejector movable relatively to said record-support, an ejector-lock, a slide mounted for movement along said carriage guide-bar, a carriage slidable on said bar with which said slide is movable away from an initial position, means on said slide for making said ejector-lock ineffective when the slide is in its initial position, means on said carriage preventing movement of said slide to initial position when the carriage is out of initial position, control means to make the carriage movable by hand, and means actuated by operation of said control means to interlock the carriage and slide for movement together back to initial position.

40. In a dictating machine, in combination, a record-support, a carriage guide-bar, a record-ejector movable relatively to said record-support, an ejector-lock, a slide mounted for movement along said carriage guide-bar, a carriage slidable on said bar with which said slide is movable away from an initial position, means on said slide for making said ejector-lock ineffective when the slide is in its initial position, means on said carriage preventing movement of said slide to initial postion when the carrage is out of initial position, state-control means to make the carriage movable by hand, a stylus mounted on the carriage normally to assume an operative position, and means actuated by operation of said state-control means to move the stylus to inoperative position and to interlock said carriage and slide for movement together back to initial position.

41. In a dictating machine, in combination, a record-support, a carriage guide-bar, a record-ejector movable relatively to said record-support, an ejector-lock, a slide mounted for movement along said carriage guide-bar, a carriage slidable on said bar with which said slide is movable away from an initial position, means on said slide for making said ejector-lock ineffective when the slide is in its initial position, means on said carriage preventing movement of said slide to initial position when the carriage is out of initial position, a recording stylus movable relatively to said carriage and normally maintained in a lowered position to engage a record on said support, a reproducing stylus normally held in a fully raised position out of engagement with said record, state-control means, means actuated by an operation of said state-control means to move both of said styli to a partially raised position where both will be out of engagement with said record, and means associated with said last means for interlocking said carriage and slide for movement together back to initial position.

42. In a dictating machine, in combination, a record-support, a carriage guide-bar, a record-ejector movable relatively to said record-support, an ejector-lock, a slide mounted for movement along said carriage guide-bar, a carriage slidable on said bar with which said slide is movable away from an initial position, means on said slide for making said ejector-lock ineffective when the slide is in its initial position, means on said carriage preventing movement of said slide to initial position when the carrage is out of initial position, a recording stylus movable relatively to said carriage and normally maintained in a lowered position to engage a record on said support, a reproducing stylus normally held in a fully raised position out of engagement with said record, state-control means, means actuated by an operation of said state-control means to move both of said styli to a partially raised position where both will be out of engagement with said record, and means responsive to said operation of the state-control means for permitting manual return of said carriage to initial position.

43. In a dictating machine, in combination, a record-support, a carriage guide-bar, a record-ejector movable relatively to said record-support, an ejector-lock, a slide mounted for movement along said carriage guide-bar, a carriage slidable on said bar with which said slide is movable away from an initial position, means on said slide for making said ejector-lock ineffective when the slide is in its initial position, means on said carriage preventing movement of said slide to initial position when the carriage is out of initial position, a recording stylus movable relatively to said carriage and normally maintained in a lowered position to engage a record on said support, a reproducing stylus normally held in a fully raised position out of engagement with said record, state-control means, means actuated by an operation of said state-control means to move both of said styli to a partially raised position where both will be out of engagement with said record, means associated with said last means for interlocking said carriage and slide for movement together back to initial position, and means responsive to said operation of the state-control means for permitting manual return of said carriage to initial position.

44. In a dictating machine, in combination, a record-support, a carriage guide-bar, a record-ejector movable relatively to said record-support, an ejector-lock, a slide mounted for movement along said carriage guide-bar, a carriage slidable on said bar with which said slide is movable away from an initial position, means on said slide for making said lock ineffective when the slide is in its initial position, means on said carriage preventing movement of said slide to initial position when the carriage is out of initial position, a recording stylus movable relatively to said carriage and normally maintained in a lowered position to engage a record on said support, a reproducing stylus normally held in a fully raised position out of engagement with said record, state-control means, means actuated by an operation of said state-control means to move both of said styli to a partially raised position where both will be out of engagement with said record, means responsive to said operation of the state-control means for permitting manual return of said carriage to initial position, means for reconditioning said recording stylus to engage the record upon release of said state-control means, means for actuating said record-ejector, and means for raising said recording stylus from the record when said record-ejector is actuated.

45. In a dictating machine, in combination, a rotatable mandrel, a carriage support, a carriage mounted upon said support, means for advancing said carriage along said support for recording on a record carried by said mandrel, a lever movable from a central position to a position for releasing said carriage-advancing means and conditioning the carriage for manual backspacing, a recording stylus normally in engagement with the record, a reproducing stylus normally out of engagement with the record when said lever is in its central position, and stylus-shifting means responsive to movement of said control lever to backspace position for making said recording stylus inoperative and enabling said reproducing stylus effectively to engage the record upon return of said lever to its central position.

46. In a dictating machine, in combination, a rotatable mandrel, a carriage support, a carriage mounted upon said support, means for advancing said carriage along said support for recording on a record carried by said mandrel, a lever movable from a central position to a position for releasing said carriage advancing means and conditioning the carriage for manual backspacing, a recording stylus normally in engagement with the record, a reproducing stylus normally out of engagement with the record when said lever is in its central position, stylus-shifting means responsive to movement of said control lever to backspace position for making said recording stylus inoperative and enabling said reproducing stylus effectively to engage the record upon return of said lever to its central position, a safety slide on said carriage support adapted in the inoperative position of said recording stylus to limit the advance of said carriage and normally movable with said carriage from an initial position during recording, and means for relatively moving said slide a predetermined distance in advance of said carriage when said control lever is moved to backspace position.

47. In a dictating machine, in combination, a rotatable mandrel, a carriage support, a carriage mounted upon said support, means for advancing said carriage along said support for recording on a record carried by said mandrel, a lever movable from a central position to a position for releasing said carriage advancing means and conditioning the carriage for manual backspacing, a recording stylus normally in engagement with the record, a reproducing stylus normally out of engagement with the record when said lever is in its central position, stylus-shifting means responsive to movement of said control lever to backspace position for making said recording stylus inoperative and enabling said reproducing stylus effectively to engage the record upon return of said lever to its central position, a safety slide on said carriage support adapted in the inoperative position of said recording stylus to limit the advance of said carriage and normally movable with said carriage from an initial position during recording, means for relatively moving said slide a predetermined distance in advance of said carriage when said control lever is moved to backspace position, and means for locking said safety slide in said advance position.

48. In a dictating machine, in combination, a rotatable mandrel, a carriage support, a carriage mounted upon said support, means for advancing said carriage along said support for recording on a record carried by said mandrel, a lever movable from a central position to a position for releasing said carriage advancing means and conditioning the carriage for manual backspacing, a recording stylus normally in engagement with the record, a reproducing stylus normally out of engagement with the record when said lever is in its central position, stylus-shifting means responsive to movement of said control lever to backspace position for making said recording stylus inoperative and enabling said reproducing stylus effectively to engage the record upon return of said lever to its central position, a safety slide on said carriage support adapted in the inoperative position of said recording stylus to limit the advance of said carriage and normally movable with said carriage from an initial position during recording, means for relatively moving said slide a predetermined distance in advance of said carriage when said control lever is moved to backspace position, means for locking said safety slide in said advance position, means for automatically returning said state-control lever to central position, and means adapted to actuate said shifting means to set the recording stylus for recording and release said safety slide when said carriage has moved beyond its former advance position the predetermined distance set by said slide.

49. In a dictating machine having a carriage support, in combination, a carriage block slidably mounted upon said support, a stylus support movable with respect to said carriage into operative and inoperative positions, a plurality of relatively movable slides mounted upon said block for conditioning said stylus support, and means movably mounted upon said block and acting directly upon each of a pair of said slides for controlling the operation of said slides.

50. In a dictating machine having a carriage support, in combination, a carriage block slidably mounted upon said support, a stylus support movable with respect to said carriage into operative and inoperative positions, a pair of slides mounted upon said block and interconnected to move simultaneously in opposite directions and adapted to condition said stylus support, resilient means normally biasing said slides to position said stylus support inoperatively, and means movable with respect to said block for controlling the operation of said slides.

51. In a dictating machine having a carriage support, in combination, a carriage block slidably mounted upon said support, a stylus weight-lever movable with respect to said carriage into operative and inoperative portions, a pair of slides mounted upon said block and interconnected to move simultaneously in opposite directions and adapted to condition said weight-lever, resilient means normally biasing said slides to position said weight-lever inoperatively, and means movably mounted upon said support for controlling the operation of said slides.

52. In a dictating machine having a carriage support, in combination, a carriage block slidably mounted upon said support, a stylus weight-lever movable with respect to said carriage into operative and inoperative positions, a pair of slides mounted upon said block and interconnected to move simultaneously in opposite directions and adapted to condition said weight-lever, a third slide mounted upon said block and movable relatively to both of said other slides, resilient means normally biasing all of said slides to position said weight-lever inoperatively, and means movable with respect to said block for controlling the operation of said slides.

53. In a dictating machine having a carriage support, in combination, a carriage block slidably mounted upon said support, a stylus weight-lever movable with respect to said carriage into operative and inoperative positions, a pair of slides mounted upon said block and interconnected to move simultaneously in opposite directions and adapted to condition said weight-lever, a third slide mounted upon said block and movable relatively to both of said other slides, resilient means normally biasing all of said slides to position said weight-lever inoperatively, a feed-screw mounted upon said support, a feed-nut mounted in said block to engage said feed-screw, and supporting means normally holding said feed-nut in effective driving relation to said block.

54. In a dictating machine having a carriage support, in combination, a carriage block slidably mounted upon said support, a stylus weight-lever movable with respect to said carriage into operative and inoperative positions, a pair of slides mounted upon said block and interconnected to move simultaneously in opposite directions and adapted to condition said weight-lever, a third slide mounted upon said block and movable relatively to both of said other slides, resilient means normally biasing all of said slides to position said weight-lever inoperatively, a feed-screw mounted upon said support, a feed-nut mounted in said block to engage said feed-screw, supporting means normally holding said feed-nut in effective driving relation to said block, and means movably mounted upon said block to control the operation of said slides and to release said feed-nut from its driving relation with said block.

55. In a dictating machine having a carriage support, in combination, a carriage block slidably mounted upon said support, a pair of stylus weight-levers movable with respect to said carriage into operative and inoperative positions, a plurality of slides mounted upon said block and interconnected simultaneously to move in opposite directions and shift one of said weight-levers into an inoperative position and the other of said weight-levers into an operative position, and means movable with respect to said block to control the operation of said slides.

56. In a dictating machine, in combination, a carriage support, a carriage slidably mounted upon said support, a reproducing stylus-carrier and a recording stylus-carrier pivotally mounted upon said carriage and each movable into operative and inoperative positions, a pair of slides mounted upon said carriage and interconnected to move simultaneously in opposite directions, each slide being adapted to shift one of said carriers, resilient means normally biasing said slides to position said recording stylus-carrier operatively and said reproducing stylus-carrier inoperatively, and a state-control lever for operating said slides and movable to a station to reverse the relative positions of said stylus-carriers.

57. In a dictating machine, in combination, a carriage support, a carriage slidably mounted upon said support, a reproducing stylus-carrier and a recording stylus-carrier pivotally mounted upon said carriage and each movable into operative and inoperative positions, a pair of slides mounted upon said carriage and interconnected to move simultaneously in opposite directions, each slide being adapted to shift one of said carriers, resilient means normally biasing said slides to position said recording stylus-carrier operatively and said reproducing stylus-carrier inoperatively, a state-control lever for operating said slides and movable to a station to reverse the relative positions of said stylus-carriers, said control lever being movable to another position to render both of said stylus-carriers inoperative.

58. In a dictating machine, in combination, a carriage support, a carriage slidably mounted upon said support, a reproducing stylus-carrier and a recording stylus-carrier pivotally mounted upon said carriage and each movable into operative and inoperative positions, a pair of slides mounted upon said carriage and interconnected to move simultaneously in opposite directions, each slide being adapted to shift one of said carriers, resilient means normally biasing said slides to position said recording stylus-carrier operatively and said reproducing stylus-carrier inoperatively, a state-control lever for operating said slides and movable to a station to reverse the relative positions of said stylus-carriers, a member mounted on said carriage support to slide with said carriage, and means responsive to operation of said slides for moving said member along said support a predetermined distance in advance of said carriage.

59. In a dictating machine, a recording and reproducing sound-box, means normally conditioning said sound-box for recording, a support upon which the sound-box travels, means for conditioning the sound-box for reproducing, and means for automatically rendering the sound-box inoperative for reproducing when it reaches a predetermined point in its reproducing travel.

60. In a dictating machine, a recording and reproducing sound-box normally conditioned for recording, a support upon which the sound-box travels, means for conditioning the sound-box for reproducing, and means for automatically rendering the sound-box operative for recording when it reaches a predetermined point in its reproducing travel.

61. In a dictating machine, a record mandrel, a sound-box having recording and reproducing positions relative to the mandrel, a support upon which the sound-box may travel, mechanism for backspacing the sound-box on its support, and means for concurrently rendering said backspace mechanism operative and automatically changing the sound-box from recording position into reproducing position.

62. In a dictating machine, a record mandrel, a sound-box having recording and reproducing positions relative to the mandrel, a support upon which the sound-box may travel, mechanism for backspacing the sound-box on its support, means for concurrently rendering said back-space mechanism operative and automatically changing the sound-box from recording position into reproducing position, and a control device for said means locatable at a point remote from the machine.

63. In a dictating machine, the combination of a rotatable mandrel for supporting a record cylinder, a sound-box having various operative positions, a support upon which the sound-box traverses the record cylinder, a record ejector, a farthest advance device for variously conditioning the sound-box, and a record-ejector lock movable to release said record-ejector when said farthest-advance device is moved into a predetermined position.

64. In a dictating machine having a carriage slidably mounted relatively to a rotatable mandrel, mandrel driving means, a feed-screw for imparting movement to said carriage, feed-screw actuating means for effecting forward carriage movement, a feed-screw actuating means for effecting backspacing carriage movement, control means for rendering effective said mandrel drive and forward feed actuating means, control means for rendering effective said backspacing feed actuating means, means for automatically rendering either of said control means ineffective upon activation of the other and electrically controlled means for selectively operating either of said control means.

65. In a dictating machine having a carriage slidably mounted relatively to a rotatable mandrel, mandrel driving means, a feed-screw for imparting movement to said carriage, feed-screw actuating means for effecting forward carriage movement, feed-screw actuating means for effecting backspacing carriage movement, control means for rendering effective said mandrel drive and forward feed actuating means, control means for rendering effective said backspacing feed actuating means, means for automatically rendering either of said control means ineffective upon activation of the other, and manually controlled means for selectively operating either of said control means.

66. In a dictating machine having a carriage slidably mounted relatively to a rotatable mandrel, mandrel driving means, a feed-screw for imparting movement to said carriage, feed-screw driving means for effecting forward carriage movement, feed-screw driving means for effecting backspacing carriage movement, control means for rendering effective said mandrel drive and forward feed driving means, control means for rendering effective said backspacing feed driving means, operating means for rendering effective either of said control means, and means for automatically returning to inoperative position either one of said control means when the other is actuated.

67. In a dictating machine, a structural unit comprising, in combination, a mandrel shaft, a reversible feed-screw, a drive-shaft, transmission means adapted to coact with said drive-shaft simultaneously to drive said mandrel shaft and to cause rotation of said feed-screw in one direction, transmission means adapted to coact independently with said drive-shaft to rotate said feed-screw in the opposite direction, and control means for each of said transmission means.

68. In a dictating machine, a structural unit comprising, in combination, a mandrel shaft, a reversible feed-screw, a drive-shaft, transmission means adapted to coact with said drive-shaft simultaneously to drive said mandrel shaft and to cause rotation of said feed-screw in one direction, transmission means adapted to coact with said drive-shaft to rotate said feed-screw in the opposite direction, control means for each of said transmission means, and means for controlling the operation of said control means selectively to render either of said transmission means effective.

69. In a dictating machine having a carriage slidably mounted relatively to a rotatable mandrel, a drive-shaft, a mandrel shaft, a feed-screw start-and-stop mechanism coacting with said drive shaft to cause mandrel rotation and rotation of said feed-screw, backspace mechanism coacting with said drive-shaft to cause reverse rotation of said feed-screw, means selectively controlling the operation of said start-and-stop mechanism and said backspacing mechanism, and resilient means for rendering either of said mechanisms inoperative when the other thereof is made operative by said controlling means.

70. In a dictating machine having a rotatable mandrel and a reversible feed-screw, in combination, a drive shaft, start-and-stop mechanism for enabling said drive shaft to rotate said mandrel and to rotate said feed-screw in one direction, a backspace device for interrupting the rotation of said mandrel and reversing the direction of rotation of said feed-screw, and a control device for selectively rendering said start-and-stop device or said backspace device effective.

71. In a dictating machine, in combination, a mandrel, a carriage movably mounted relatively to said mandrel, means for imparting forward motion to said carriage, means for imparting backspace motion to said carriage, forward space control mechanism, backspace control mechanism, electromagnetic means for rendering one or the other of said control means effective, and a remote control for said electromagnetic means.

72. In a phonograph, a sound-box movable transversely of a record tablet and comprising a recording stylus and a reproducing stylus alternatively movable into record engaging position, said reproducing stylus being offset behind said recording stylus with reference to the normal direction of movement of said sound-box when recording, remotely controllable mechanism operable to condition the sound box for reproducing, a releasable latch for maintaining the sound box in reproducing position after operation of said mechanism, and a member which when said sound box is advanced, after operation of said mechanism, a distance approximately equal to the offset of the reproducing stylus effects release of said latch.

73. In a phonograph, a sound box movable transversely of a record tablet and comprising a recording stylus normally biased into record engaging position and a reproducing stylus normally out of record engaging position and offset behind said recording stylus with reference to the normal direction of movement of said sound box when recording, means for feeding the sound box in an advancing direction, mechanism for effecting shifting of said recording stylus out of and said reproducing stylus into record engaging position, and means operable concurrently with said mechanism for maintaining said reproducing stylus in record engaging position for a predetermined interval of advancing movement of said sound box after operation of said mechanism.

74. In a phonograph, a sound box movable transversely of a record tablet and comprising a recording stylus movable into record engaging position, means for feeding the sound box in an advancing direction, a device operable to control movement of said recording stylus into record engaging position, and a member movable to continuously define the farthest advance of said sound box, said member being adapted to operate the said device when the sound box is in its position of farthest advance.

75. In a phonograph, a sound box movable transversely of a record tablet and comprising a recording stylus and a reproducing stylus alternatively shiftable into record engaging position, means for feeding the sound box in an advancing direction, means for backspacing the sound box, a mechanism movable in synchronism with the said sound box and operable to shift said styli, means movable by said feeding means to continuously define the farthest point of advance of said sound-box, said last named means being adapted to cooperate with said mechanism to move the latter to stylus shifting position when the sound box is in its position of farthest advance.

76. In a phonograph, a sound box movable transversely of a record tablet and comprising a recording stylus and a reproducing stylus alternatively shiftable into record engaging position, means for feeding the sound box in an advancing direction, means for imparting a back-spacing movement to said sound box, a mechanism operatively connected with said last named means and adapted to shift said styli coincidentally with a back-spacing movement, and releasable means for maintaining said sound box in the condition attained in said back-spacing movement.

77. In a phonograph, a sound box movable transversely of a record tablet and comprising a recording stylus and a reproducing stylus alternatively shiftable into record engaging position, means for feeding the sound box in an advancing direction, a coincidental mechanism for back-spacing said sound box and shifting said reproducing stylus into record engaging position, and releasable means for maintaining said reproducing stylus in record engaging position subsequent to said shifting.

78. In a phonograph, a sound box movable transversely of a record tablet and comprising a stylus for recording dictation and a stylus for reproducing recorded matter, said styli being alternatively shiftable into engagement with said record tablet, means operable to shift said styli, means for feeding said sound box in an advancing direction, a mechanism for simultaneously back-spacing said sound box and operating said shifting means to shift said reproducing stylus into record engaging position, and a device to coact with said shifting means when said recording stylus is in advance of the back-spaced area to effect shifting of said reproducing stylus out of and of said recording stylus into record engaging position.

79. In a phonograph, a sound box movable transversely of a record tablet and comprising a stylus for recording dictation and a stylus for reproducing dictated matter, said styli being alternatively shiftable into record engaging position, means operable to shift said styli, means for feeding said sound box in an advancing direction, a mechanism for simultaneously back-spacing said sound box and operating said shifting means to shift said reproducing stylus into record engaging position, a movable device to coact with said shifting means when said recording stylus is in advance of the back-spaced area to effect shifting of said reproducing stylus out of and of said recording stylus into record engaging position, and means operable coincidentally with said back-spacing mechanism to move said device to a position in advance of that which it occupied at the beginning of the back-spacing operation.

80. In a phonograph, a sound box movable transversely of a record tablet and conditionable for recording or reproducing, means for feeding said sound box in an advancing direction, means for simultaneously back-spacing said sound box and conditioning it for reproducing whereby previously dictated matter may be reproduced as said sound box is fed in an advancing direction subsequent to a back-spacing operation, a movable device automatically positioned to indicate the extent of the recorded matter on said record tablet, and a mechanism to coact with said device when all recorded matter in the back-spaced area has been reproduced after a back-spacing operation to effect the conditioning of said sound box for recording.

81. In a phonograph, a sound box movable transversely of a record tablet and conditionable for recording or reproducing, means for feeding said sound box in an advancing direction, means for simultaneously back-spacing said sound box and conditioning it for reproducing whereby previously dictated matter may be reproduced as said sound box is fed in an advancing direction subsequent to a back-spacing operation, a movable device automatically moved in synchronism with said sound box when said sound box is conditioned for recording and stationary when said sound box is conditioned for reproducing by operation of said back-spacing and conditioning means, and a mechanism movable in synchronism with said sound box when the sound box is conditioned for either recording or reproducing and coacting with said device when in a certain position relative thereto to effect the conditioning of the sound box for recording.

82. In a phonograph, a sound box movable transversely of a record tablet and conditionable for recording or reproducing, means for feeding the sound box in an advancing direction, means for back-spacing the sound box, a shifting mechanism connected to said back-spacing means to condition the sound box for reproducing before said feeding means operates subsequent to a back-spacing operation, a movable device automatically moved in synchronism with the sound box when the sound box is conditioned for recording and stationary when the sound box is conditioned for reproducing by operation of said back-spacing means, and means movable in synchronism with the sound box when it is conditioned either for recording or reproducing and coacting with said device when in a certain position relative thereto to effect the conditioning of the sound box for recording.

83. In a phonograph, a sound box conditionable for recording or reproducing, means for feeding the sound box transversely of a record tablet in an advancing direction, means for back-spacing the sound box, a shifting mechanism connected to said back-spacing means to condition the sound box for reproducing before said feeding means operates subsequent to a back-spacing operation, a movable device automatically advanced in synchronism with said sound box when the sound box is conditioned for recording and stationary when the sound box is conditioned for reproducing by operation of said back-spacing means, a member operable coincidentally with said back-spacing means to impart a slight forward spacing movement to said device, and means movable in synchronism with the sound box when it is conditioned for either recording or reproducing and coacting with said device when in a certain position relative thereto to effect the conditioning of the sound box for recording.

84. In a phonograph, a sound box movable transversely of a record tablet and comprising a recording stylus and a reproducing stylus alternatively shiftable into engagement with the record tablet, a manual control for said sound box having at least a neutral position wherein neither stylus engages the record tablet and a recording position wherein the recording stylus normally engages the record tablet, means for feeding the sound box in an advancing direction, said means being inoperative when said control is moved to neutral position, means to back-space the soundbox and to incidentally and automatically shift said reproducing stylus into engagement with said record tablet, a marking device automatically advanced in synchronism with the sound box when the recording stylus is in engagement with the record and stationary when the reproducing stylus has been moved into engagement with the record tablet by operation of said back-spacing means, and mechanism to connect said marking device for synchronous movement with said sound box at all times when said control is moved to neutral position.

85. In a phonograph, a record tablet, a carriage normally movable in an advancing direction transversely of said record tablet, a recording stylus on said carriage normally engaging and tracking said record tablet, a reproducing stylus on said carriage normally ineffective, a mechanism operable for back-spacing said carriage, means associated with said back-spacing mechanism and operable coincidentally therewith for effecting disengagement of the recording stylus from said tablet and subsequent engagement of the reproducing stylus for causing reproduction during advancing movement of the carriage over the portion of the record tablet traversed during a back-spacing movement, and means for automatically effecting restoration of the styli to their normal positions operable by the carriage in the advancing movement thereof subsequent to a back-spacing movement.

86. In a phonograph, a sound box movable transversely of a record tablet and comprising a recording stylus normally biased into record engaging position and a reproducing stylus normally out of record engaging position and offset behind said recording stylus with reference to the normal direction of movement of said sound box when recording, mechanism operable at will in any position reached by the sound-box during its advance movement for effecting shifting of said recording stylus out of and said reproducing stylus into record engaging position, means for maintaining said reproducing stylus in record engaging position after operation of said mechanism, and a device movable relatively to said sound box which when in a certain position relative to the sound box renders said means inoperative.

87. In a phonograph, a sound box movable transversely of a record tablet and comprising a recording stylus normally biased into record engaging position and a reproducing stylus normally out of record engaging position and offset behind said recording stylus with reference to the normal direction of movement of said sound box when recording, mechanism for effecting shifting of said recording stylus out of and said reproducing stylus into record engaging position, means for maintaining said reproducing stylus in record engaging position after operation of said mechanism, a device normally having a given position relative to said sound box wherein it renders said means inoperative, and a member movable coincidentally with said shifting mechanism to move said device out of its normal position relative to said sound box.

88. In a phonograph, a sound box movable transversely of a record tablet and comprising a recording stylus normally biased into record engaging position and a reproducing stylus normally out of record engaging position and offset behind said recording stylus with reference to the normal direction of movement of said sound box when recording, means for feeding the sound box in an advancing direction, mechanism for effecting shifting of said recording stylus out of and said reproducing stylus into record engaging position, means for maintaining said reproducing stylus in record engaging position after operation of said mechanism, a device normally movable in synchronism with said sound box when said sound box is moved in an advancing direction, said device normally acting to render said maintaining means inoperative, and a member coacting with said device and movable coincidentally with said mechanism to impart an advance spacing movement to said device to move it to a position in which it is ineffective for rendering said means inoperative.

89. In a phonograph, in combination, a normally operative recording stylus, a normally inoperative signal device, a record-ejector, and means associated with said record-ejector adapted to move said stylus to an inoperative position and concurrently render said signal device operative upon actuation of said record-ejector.

90. In a phonograph having translating means adapted to cooperate with a rotating record, and including record-rotating means and coacting means for moving said translating means in a determinate path together with means for actuating said record-rotating and coacting means; the combination of means for controlling the operation of said actuating means, means responsive to the presence of said translating means only within a definite predetermined portion of said path, and a signalling device for effecting a signal under the concurrent influence of said controlling means and said responsive means.

91. In a phonograph having a rotatable record support, means for actuating said record support, and a record-ejector; the combination of means for controlling the operation of said actuating means, operating means for said record-ejector, and a signalling device for effecting a signal under the concurrent influence of said actuating means and said operating means.

WILLIAM F. PEYRER.

CERTIFICATE OF CORRECTION.

Patent No. 2,152,585. March 28, 1939.

WILLIAM F. FEYRER.

It is hereby certified that error appears in the printed specification of the above numbered patent requiring correction as follows: Page 4, first column, line 23, for "feel-screw" read feed-screw; page 7, first column, line 37, for "Fig. 1" read Fig. 7; page 11, second column, line 75, strike out the period after "record" and insert instead a comma; page 20, second column, line 73, claim 51, for "portions" read positions; and that the said Letters Patent should be read with this correction therein that the same may conform to the record of the case in the Patent Office.

Signed and sealed this 27th day of June, A. D. 1939.

(Seal)

Henry Van Arsdale
Acting Commissioner of Patents.